US012120801B2

(12) United States Patent
Sebastian et al.

(10) Patent No.: US 12,120,801 B2
(45) Date of Patent: Oct. 15, 2024

(54) AEROSOL DELIVERY DEVICE WITH INTEGRATED THERMAL CONDUCTOR

(71) Applicant: RAI Strategic Holdings, Inc., Winston-Salem, NC (US)

(72) Inventors: Andries Sebastian, Clemmons, NC (US); Rajesh Sur, Winston-Salem, NC (US); Stephen B. Sears, Siler City, NC (US); Vahid Hejazi, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 353 days.

(21) Appl. No.: 17/583,700

(22) Filed: Jan. 25, 2022

(65) Prior Publication Data

US 2022/0151036 A1 May 12, 2022

Related U.S. Application Data

(63) Continuation of application No. 16/113,041, filed on Aug. 27, 2018, now Pat. No. 11,265,974.

(51) Int. Cl.

*A24F 47/00* (2020.01)
*A24D 1/14* (2006.01)
*H05B 6/10* (2006.01)

(52) U.S. Cl.

CPC *H05B 6/10* (2013.01); *A24D 1/14* (2013.01)

(58) Field of Classification Search

CPC ................................ A24D 1/20; A24F 40/465
See application file for complete search history.

(56) References Cited

U.S. PATENT DOCUMENTS 2,057,353 A 10/1936 Whittemore, Jr.
2,104,266 A 1/1938 McCormick
(Continued)

FOREIGN PATENT DOCUMENTS

CN 1541577 11/2004
CN 2719043 8/2005
(Continued)

OTHER PUBLICATIONS

"LM2743 Low Voltage N-Channel MOSFET Synchronous Buck Regulator Controller", Texas Instruments, Oct. 2015, pp. 1-41.
(Continued)

*Primary Examiner* — Eric Yaary
(74) *Attorney, Agent, or Firm* — WOMBLE BOND DICKINSON (US) LLP

(57) ABSTRACT

Aerosol delivery devices and aerosol source members are disclosed herein. In one aspect, an aerosol delivery device may comprise a control body having a closed distal end and an open engaging end, a heating member, a control component located within the control body and configured to control the heating member, a power source located within the control body and configured to provide power to the control component, and a removable aerosol source member that includes a substrate portion. The substrate portion may include a continuous heat conductive framework integrated with an aerosol forming material, wherein the continuous thermally conductive framework is configured to enhance heat transfer from the heating member to the aerosol forming material.

20 Claims, 9 Drawing Sheets

(56) References Cited

U.S. PATENT DOCUMENTS

| | | | |
|---|---|---|---|
| 3,200,819 | A | 8/1965 | Gilbert |
| 4,922,901 | A | 5/1990 | Brooks et al. |
| 5,060,671 | A | 10/1991 | Counts et al. |
| 5,093,894 | A | 3/1992 | Deevi et al. |
| 5,144,962 | A | 9/1992 | Counts et al. |
| 5,261,424 | A | 11/1993 | Sprinkel, Jr. |
| 5,300,750 | A | 4/1994 | Carter, Jr. et al. |
| 5,388,574 | A | 2/1995 | Ingerethsen et al. |
| 5,530,225 | A | 6/1996 | Hajaligol |
| 5,687,746 | A | 11/1997 | Rose et al. |
| 5,726,421 | A | 3/1998 | Fleischhauer et al. |
| 5,865,185 | A | 2/1999 | Collins et al. |
| 5,894,841 | A | 4/1999 | Voges |
| 6,125,853 | A | 10/2000 | Susa et al. |
| 6,155,268 | A | 12/2000 | Takeuchi |
| 7,117,867 | B2 | 10/2006 | Cox et al. |
| 7,832,410 | B2 | 11/2010 | Hon |
| 8,314,591 | B2 | 11/2012 | Terry et al. |
| 8,365,742 | B2 | 2/2013 | Hon |
| 8,499,766 | B1 | 8/2013 | Newton |
| 2005/0016550 | A1 | 1/2005 | Katase |
| 2006/0196518 | A1 | 9/2006 | Hon |
| 2008/0092912 | A1 | 4/2008 | Robinson et al. |
| 2009/0095311 | A1 | 4/2009 | Hon |
| 2009/0126745 | A1 | 5/2009 | Hon |
| 2009/0188490 | A1 | 7/2009 | Hon |
| 2009/0272379 | A1 | 11/2009 | Thorens et al. |
| 2011/0094523 | A1 | 4/2011 | Thorens et al. |
| 2011/0126848 | A1 | 6/2011 | Zuber et al. |
| 2011/0155718 | A1 | 6/2011 | Greim et al. |
| 2011/0168194 | A1 | 7/2011 | Hon |
| 2011/0265806 | A1 | 11/2011 | Alarcon et al. |
| 2011/0290248 | A1 | 12/2011 | Schennum |
| 2012/0111347 | A1 | 5/2012 | Hon |
| 2012/0260927 | A1 | 10/2012 | Liu |
| 2012/0279512 | A1 | 11/2012 | Hon |
| 2013/0037041 | A1 | 2/2013 | Worm et al. |
| 2013/0056013 | A1 | 3/2013 | Terry et al. |
| 2013/0306084 | A1 | 11/2013 | Flick |
| 2014/0000638 | A1 | 1/2014 | Sebastian et al. |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0096782 | A1 | 4/2014 | Ampolini et al. |
| 2014/0209105 | A1 | 7/2014 | Sears et al. |
| 2014/0253144 | A1 | 9/2014 | Novak et al. |
| 2014/0261408 | A1 | 9/2014 | DePiano et al. |
| 2014/0261486 | A1 | 9/2014 | Potter et al. |
| 2014/0261487 | A1 | 9/2014 | Chapman et al. |
| 2014/0261495 | A1 | 9/2014 | Novak et al. |
| 2014/0270727 | A1 | 9/2014 | Ampolini et al. |
| 2014/0270729 | A1 | 9/2014 | DePiano et al. |
| 2014/0270730 | A1 | 9/2014 | DePiano et al. |
| 2016/0021934 | A1 | 1/2016 | Cadieux et al. |
| 2016/0309785 | A1 | 10/2016 | Holtz |
| 2017/0055584 | A1 | 3/2017 | Blandino et al. |
| 2017/0347714 | A1 | 12/2017 | Metz et al. |
| 2018/0279681 | A1* | 10/2018 | Rojo-Calderon ........ A24D 1/20 |

FOREIGN PATENT DOCUMENTS

| | | |
|---|---|---|
| CN | 201379072 | 1/2010 |
| CN | 103767071 A | 5/2014 |
| CN | 204426695 U | 7/2015 |
| CN | 104905404 A | 9/2015 |
| CN | 206565283 U | 10/2017 |
| EP | 0 295 122 | 12/1988 |
| EP | 0 845 220 | 6/1998 |
| EP | 1 618 803 | 1/2006 |
| GB | 2469850 | 11/2010 |
| WO | WO 2003/034847 | 5/2003 |
| WO | WO 2004/080216 | 9/2004 |
| WO | WO 2005/099494 | 10/2005 |
| WO | WO 2007/131449 | 11/2007 |
| WO | WO 2017/068100 | 4/2017 |
| WO | WO 2019/171331 | 9/2019 |

OTHER PUBLICATIONS

International Search Report from corresponding International Application No. PCT/IB2019/057114, mailed Dec. 19, 2019.

* cited by examiner

AEROSOL DELIVERY DEVICE WITH INTEGRATED THERMAL CONDUCTOR

CROSS-REFERENCE TO RELATED APPLICATIONS

This application is a continuation of U.S. patent application Ser. No. 16/113,041, filed on Aug. 27, 2018, which is incorporated herein in its entirety by reference.

BACKGROUND

Field of the Disclosure

The present disclosure relates to aerosol delivery articles and uses thereof for yielding tobacco components or other materials in inhalable form. More particularly, the present disclosure relates to aerosol delivery devices and systems, such as smoking articles, that utilize electrically-generated heat to heat a material, in order to provide an inhalable substance in the form of an aerosol for human consumption.

Description of Related Art

Many smoking articles have been proposed through the years as improvements upon, or alternatives to, smoking products based upon combusting tobacco. Example alternatives have included devices wherein a solid or liquid fuel is combusted to transfer heat to tobacco or wherein a chemical reaction is used to provide such heat source. Examples include the smoking articles described in U.S. Pat. No. 9,078,473 to Worm et al., which is incorporated herein by reference in its entirety.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference in their entireties. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference in its entirety. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; U.S. Pat. App. Pub. No. 2009/0095311 to Hon; U.S. Pat. App. Pub. Nos. 2006/0196518, 2009/0126745, and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; and PCT Pat. App. Pub. No. WO 2010/091593 to Hon, which are incorporated herein by reference in their entireties.

Representative products that resemble many of the attributes of traditional types of cigarettes, cigars or pipes have been marketed as ACCORD® by Philip Morris Incorporated; ALPHA™, JOYE510™ and M4™ by InnoVapor LLC; CIRRUS™ and FLING™ by White Cloud Cigarettes; BLU™ by Fontem Ventures B.V.; COHITA™, COLIBRI™, ELITE CLASSIC™, MAGNUM™, PHANTOM™ and SENSE™ by EPUFFER International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™ HENDU™ JET™, MAXXQ™ PINK™ and PITBULL™ by SMOKE STIK®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd.; IQOS™ by Philip Morris International; and GLO™ by British American Tobacco. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; and SOUTH BEACH SMOKE™.

Articles that produce the taste and sensation of smoking by electrically heating tobacco or tobacco derived materials have suffered from inconsistent performance characteristics. Electrically heated smoking devices have further been limited in many instances by requiring large battery capabilities. Accordingly, it is desirable to provide a smoking article that can provide the sensations of cigarette, cigar, or pipe smoking, without substantial combustion, and that does so with advantageous performance characteristics.

BRIEF SUMMARY

In various implementations, the present disclosure provides an aerosol delivery device configured to yield an inhalable substance. In one implementation, the aerosol delivery device may comprise a control body having a closed distal end and an open engaging end, a heating member, a control component located within the control body and configured to control the heating member, a power source located within the control body and configured to provide power to the control component, and a removable aerosol source member that includes a substrate portion, the aerosol source member being configured to be inserted into the engaging end of the control body and defining a heated end and a mouth end, the heated end configured, when inserted into the control body, to be positioned proximate the heating member, and the mouth end configured to extend beyond the engaging end of the control body. The substrate portion may include a continuous thermally conductive framework integrated with an aerosol forming material, and the continuous thermally conductive framework may be configured to enhance heat transfer from the heating member to the aerosol forming material. In some implementations, the continuous thermally conductive framework may comprise a coil integrated with a substantially cylindrical aerosol forming material. In some implementations, the coil may be disposed about an outer surface of the aerosol forming material. In some implementations, the coil may be disposed within the aerosol forming material. In some implementations, the coil may be disposed about an outer surface of the aerosol forming material and within the aerosol forming material.

In some implementations, the continuous thermally conductive framework may comprise an interwoven braid. In some implementations, the interwoven braid may be disposed about an outer surface of the aerosol forming material. In some implementations, the interwoven braid may be disposed within the aerosol forming material. In some implementations, the continuous thermally conductive framework may comprise a central elongate component having a plurality of spikes extending radially therefrom. In some implementations, the continuous thermally conductive framework comprises at least one of a metal material, a coated metal material, a ceramic material, a carbon material, a polymer composite, and any combination thereof. In some implementations, the substrate portion may comprise an extruded hollow structure. In some implementations, the substrate portion may comprise a single centrally located longitudinal hole and/or a plurality of longitudinal holes. In some implementations, the substrate portion may comprise a substantially solid structure. In some implementations, the substrate portion may comprise a tobacco or a tobacco-derived material. In some implementations, the substrate portion may comprise a non-tobacco material. In some implementations, the heating member may comprise a conductive heat source. In some implementations, the heating member may comprise an inductive heat source.

In various implementations, the present disclosure also provides an aerosol source member configured to removably engage an engaging end of a control body that includes a heating member. In one implementation, the aerosol source member may comprise a heated end and a mouth end, the heated end configured, when inserted into the control body, to be positioned proximate the heating member, and the mouth end configured to extend beyond the engaging end of the control body, and a substrate portion that includes a continuous thermally conductive framework integrated with an aerosol forming material. The continuous thermally conductive framework may be configured to enhance heat transfer from the heating member to the aerosol forming material. In some implementations, the continuous thermally conductive framework may comprise a coil integrated with a substantially cylindrical aerosol forming material. In some implementations, the coil may be disposed about an outer surface of the aerosol forming material. In some implementations, the coil may be disposed within the aerosol forming material. In some implementations, the coil may be disposed about an outer surface of the aerosol forming material and within the aerosol forming material.

In some implementations, the continuous thermally conductive framework may comprise an interwoven or overlapping braid. In some implementations, the interwoven braid may be disposed about an outer surface of the aerosol forming material. In some implementations, the interwoven braid may be disposed within the aerosol forming material. In some implementations, the continuous thermally conductive framework may comprise a central elongate component having a plurality of spikes extending radially therefrom. In some implementations, the continuous thermally conductive framework may comprise at least one of a metal material, a coated metal material, a ceramic material, a carbon material, a polymer composite, and any combination thereof. In some implementations, the substrate portion may comprise an extruded hollow structure. In some implementations, the substrate portion may comprise a single centrally located longitudinal hole and/or a plurality of longitudinal holes. In some implementations, the substrate portion may comprise a substantially solid structure. In some implementations, the substrate portion may comprise a tobacco or a tobacco-derived material. In some implementations, the substrate portion may comprise a non-tobacco material.

These and other features, aspects, and advantages of the present disclosure will be apparent from a reading of the following detailed description together with the accompanying drawings, which are briefly described below.

BRIEF DESCRIPTION OF THE DRAWINGS

Figure 1:
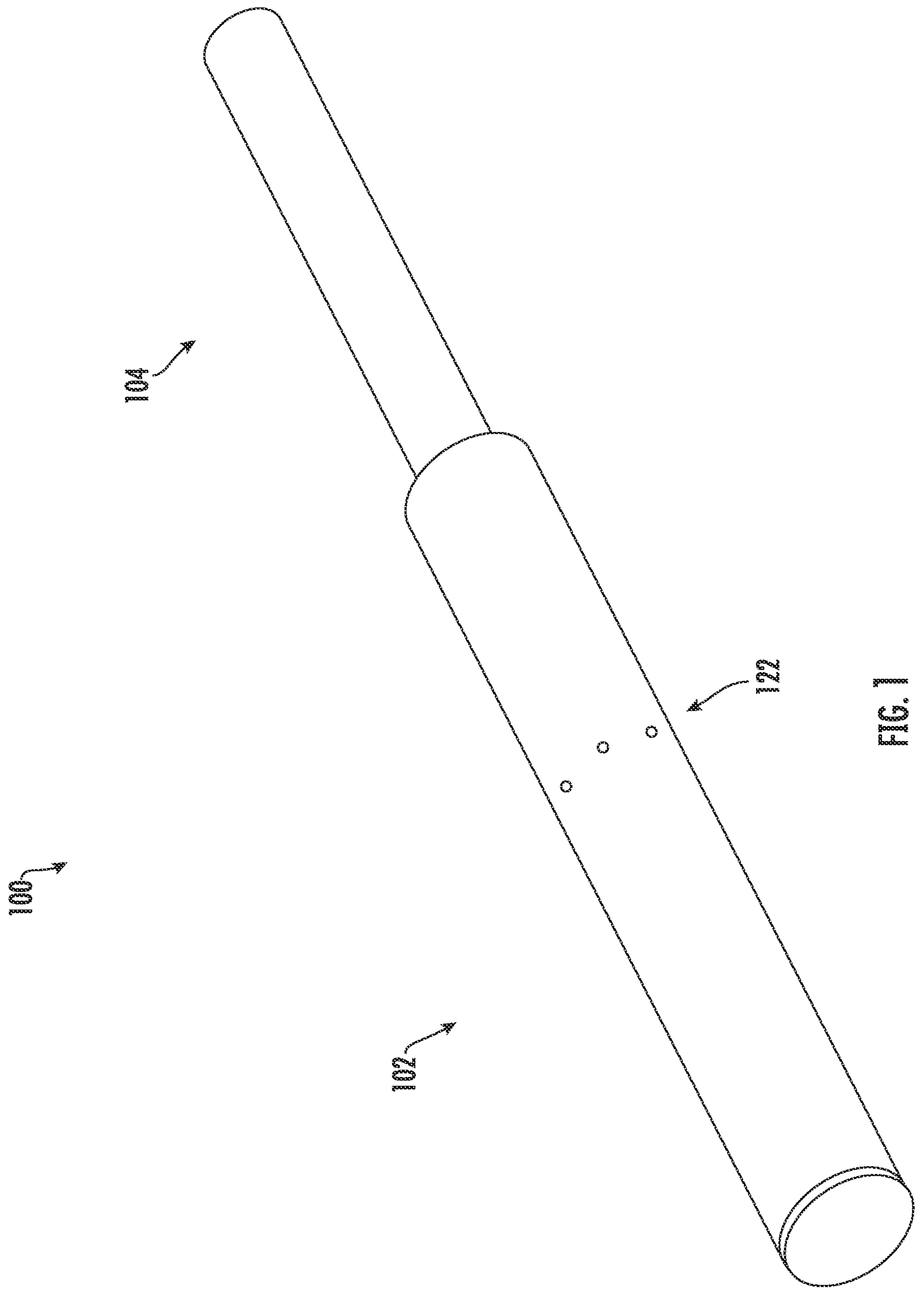
Figure 2:
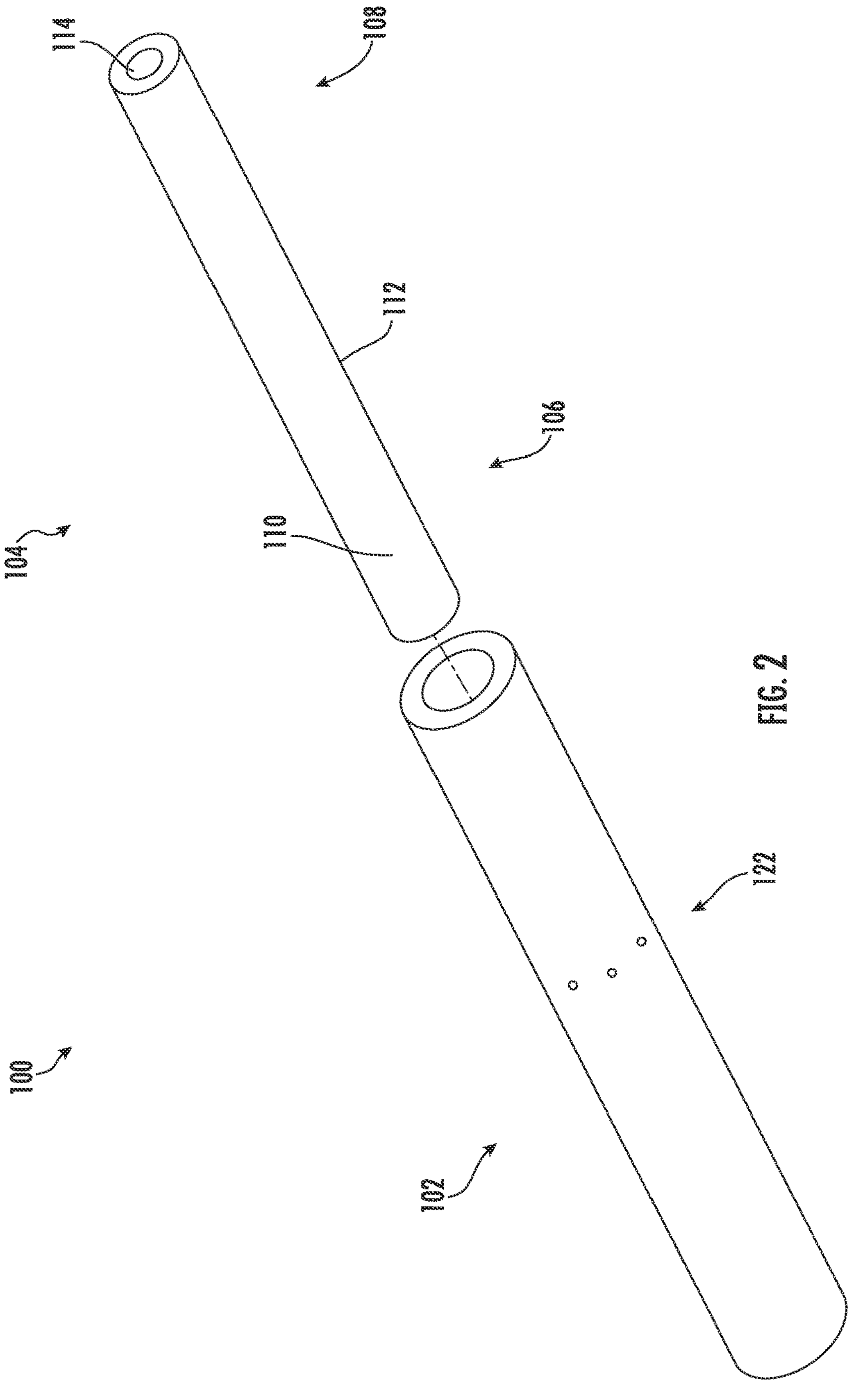
Figure 3:
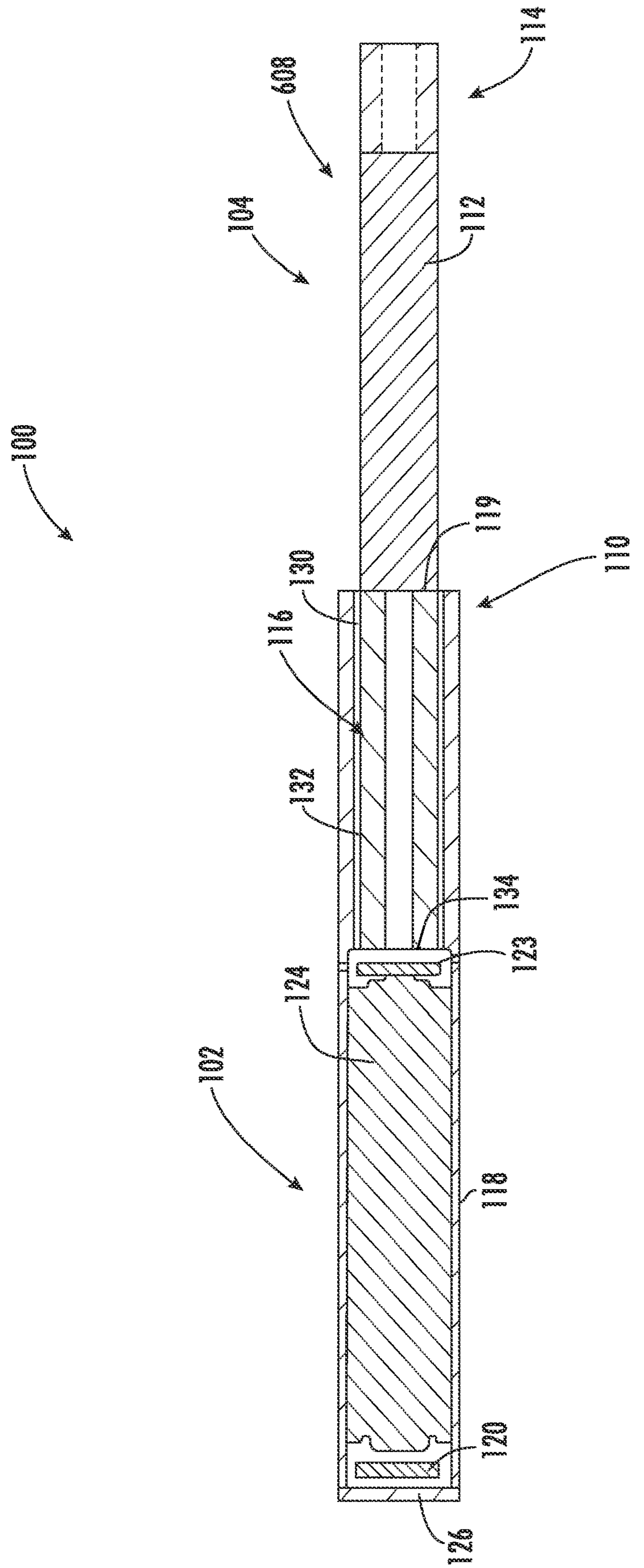
Figure 4:
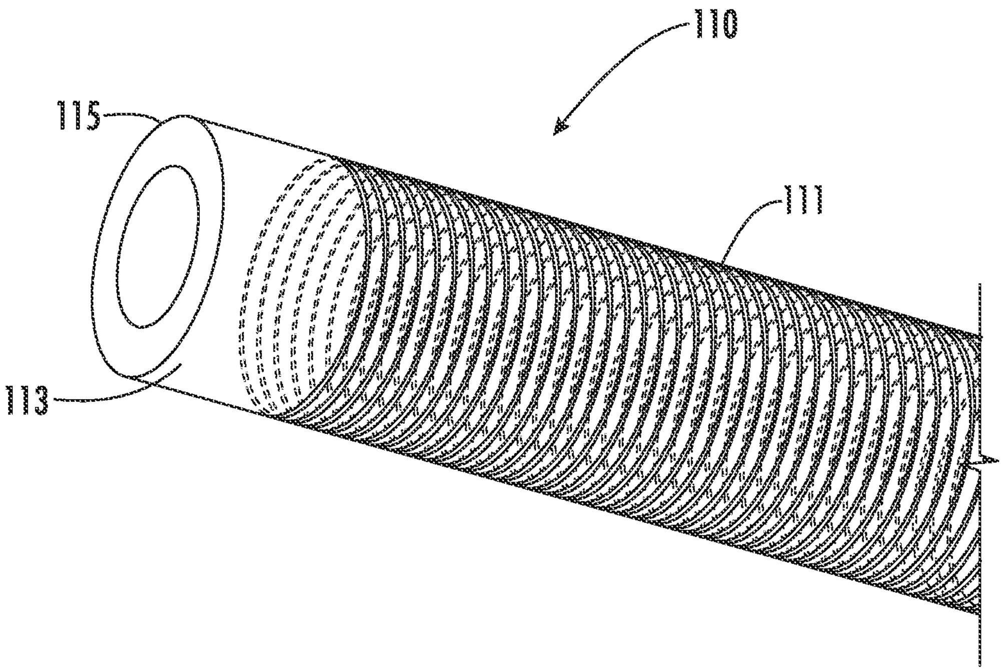
Figure 5:
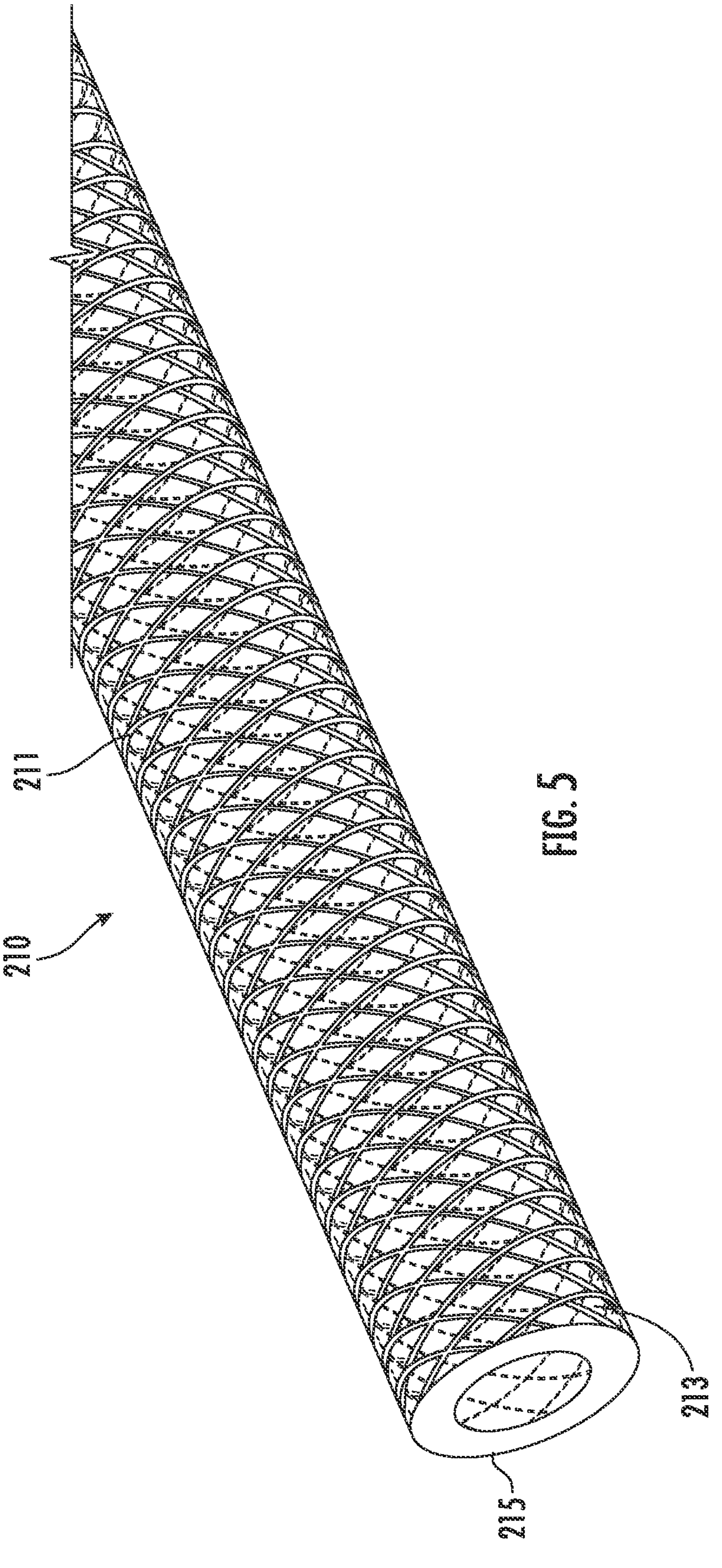
Figure 6:
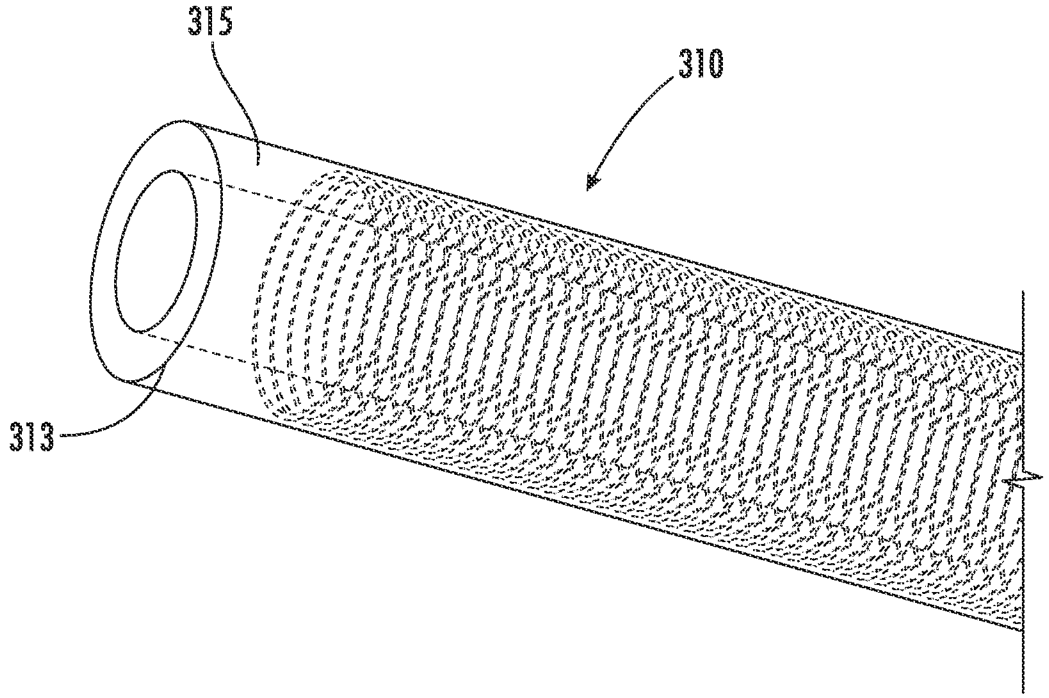
Figure 7:
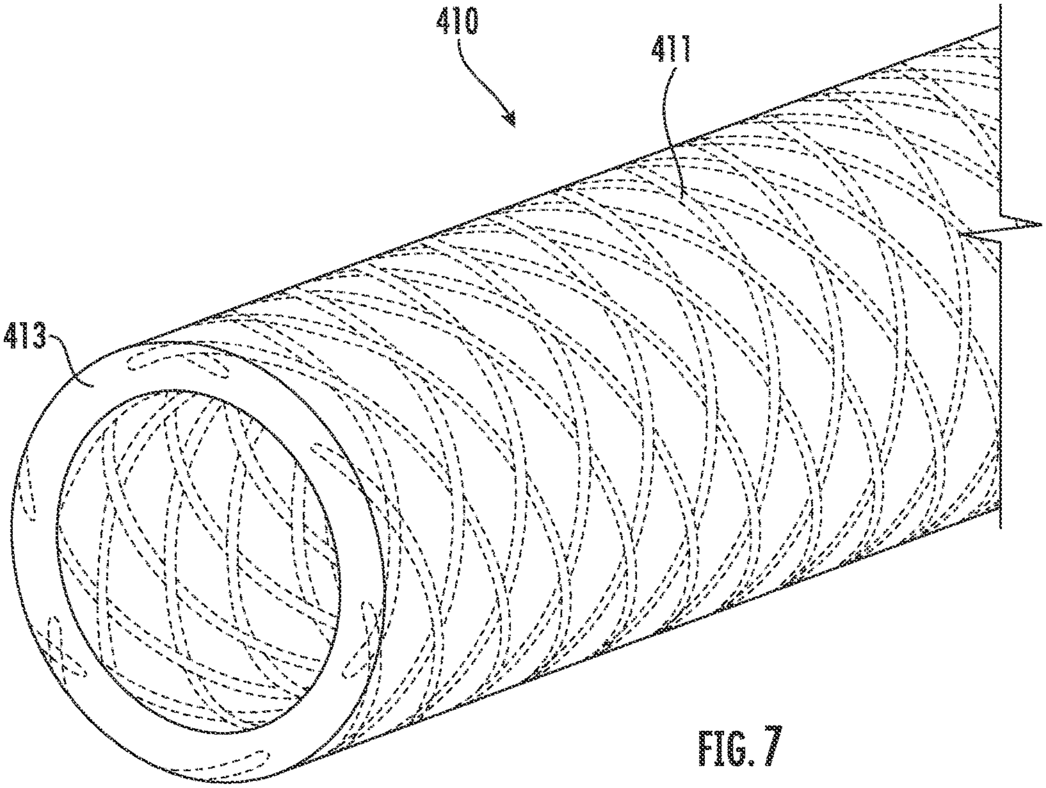
Figure 8:
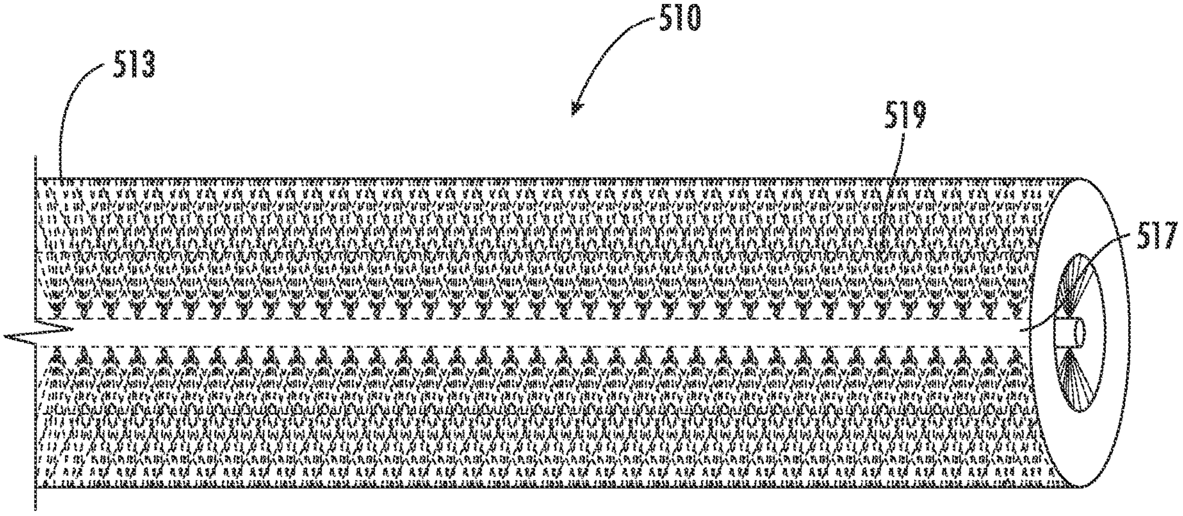
Figure 9:
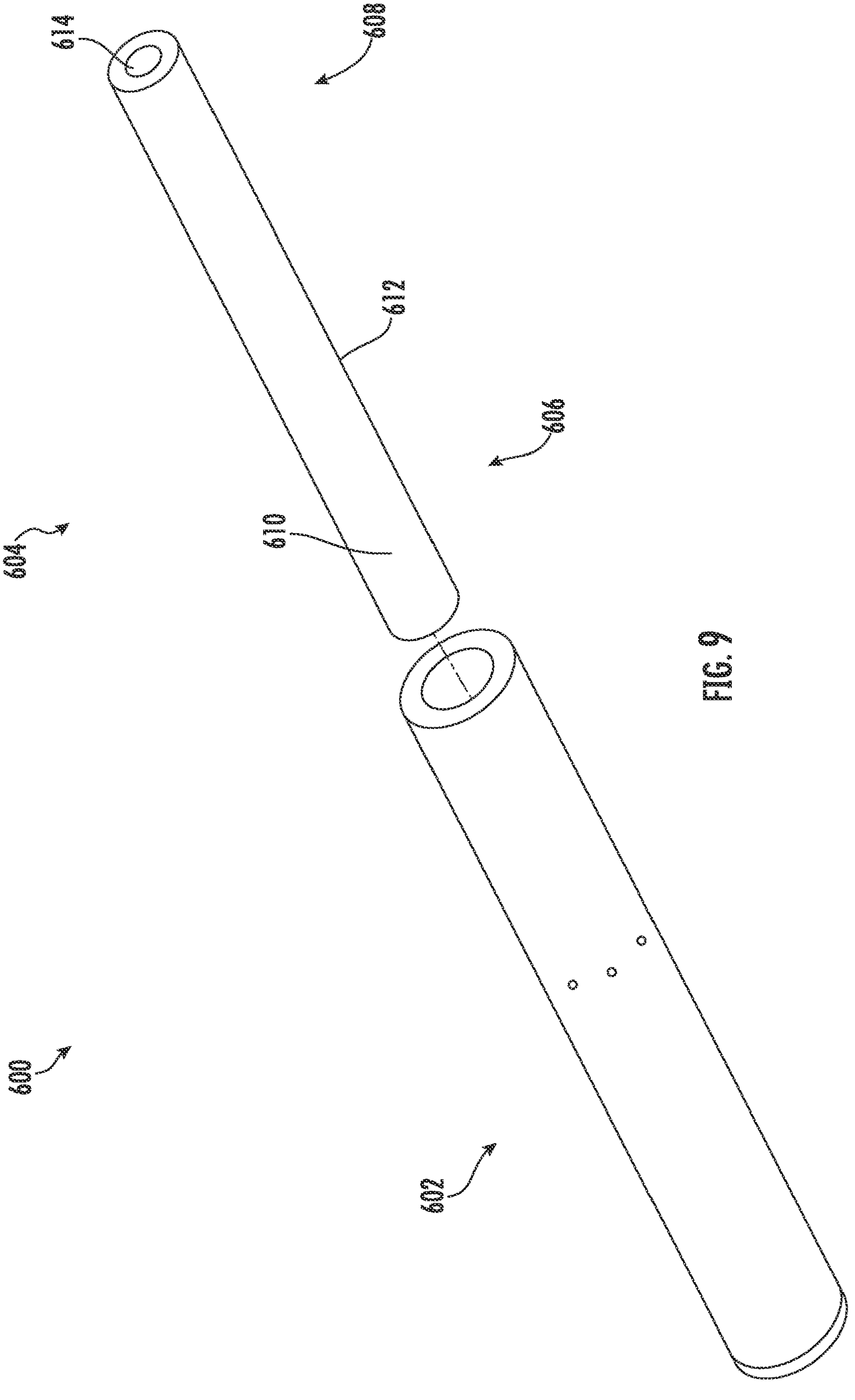
Figure 10:
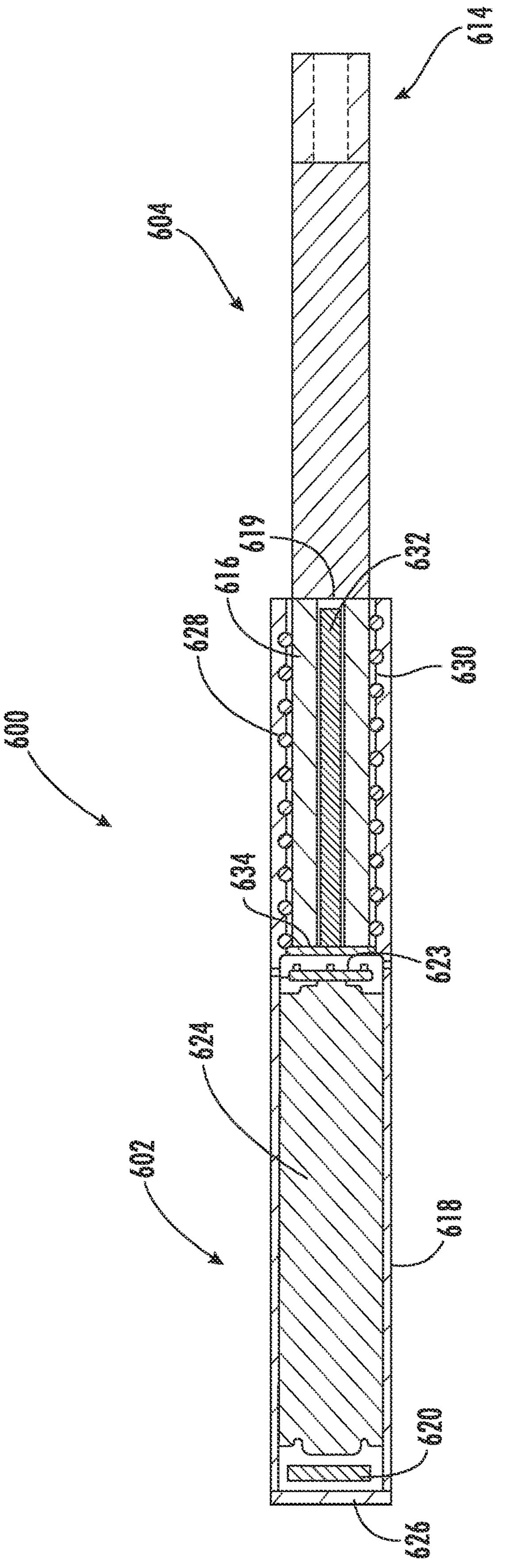

Having thus described the present disclosure in the foregoing general terms, reference will now be made to the accompanying drawings, which are not necessarily drawn to scale, and wherein:

FIG. 1 illustrates a perspective view of an aerosol delivery device comprising a control body and an aerosol source member, wherein the aerosol source member and the control body are coupled to one another, according to an example implementation of the present disclosure;

FIG. 2 illustrates a perspective view of the aerosol delivery device of FIG. 1 wherein the aerosol source member and the control body are decoupled from one another, according to an example implementation of the present disclosure;

FIG. 3 illustrates a front schematic cross-sectional view of an aerosol delivery device, according to an example implementation of the present disclosure;

FIG. 4 illustrates a perspective view of part of an aerosol source member showing a substrate portion that includes a continuous thermally conductive framework, according to another example implementation of the present disclosure;

FIG. 5 illustrates a perspective view of part of an aerosol source member showing a substrate portion that includes a continuous thermally conductive framework, according to another example implementation of the present disclosure;

FIG. 6 illustrates a perspective view of part of an aerosol source member showing a substrate portion that includes a continuous thermally conductive framework, according to another example implementation of the present disclosure;

FIG. 7 illustrates a perspective view of part of an aerosol source member showing a substrate portion that includes a continuous thermally conductive framework, according to another example implementation of the present disclosure;

FIG. 8 illustrates a perspective view of part of an aerosol source member showing a substrate portion that includes a continuous thermally conductive framework, according to another example implementation of the present disclosure;

FIG. 9 illustrates a perspective view of an aerosol delivery device wherein the aerosol source member and the control body are decoupled from one another, according to an example implementation of the present disclosure; and FIG. 10 illustrates a front schematic cross-sectional view of the aerosol delivery device of FIG. 9, according to an example implementation of the present disclosure.

DETAILED DESCRIPTION

The present disclosure will now be described more fully hereinafter with reference to example implementations thereof. These example implementations are described so that this disclosure will be thorough and complete, and will fully convey the scope of the present disclosure to those skilled in the art. Indeed, the present disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations of the present disclosure relate to aerosol delivery devices. Aerosol delivery devices according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery devices does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery devices may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes," or "tobacco heating products," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure may also be characterized as being vapor-producing articles or medicament delivery articles. Thus, such articles or devices may be adapted so as to provide one or more substances (e.g., flavors and/or pharmaceutical active ingredients) in an inhalable form or state. For example, inhalable substances may be substantially in the form of a vapor (i.e., a substance that is in the gas phase at a temperature lower than its critical point). Alternatively, inhalable substances may be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like. The physical form of the inhalable substance is not necessarily limited by the nature of the disclosed devices but rather may depend upon the nature of the medium and the inhalable substance itself as to whether it exists in a vapor state or an aerosol state. In some implementations, the terms may be interchangeable. Thus, for simplicity, the terms as used to describe the present disclosure are understood to be interchangeable unless stated otherwise.

Aerosol delivery devices of the present disclosure generally include a number of components provided within an outer body or shell, which may be referred to as a housing. The overall design of the outer body or shell may vary, and the format or configuration of the outer body that may define the overall size and shape of the aerosol delivery device may vary. Typically, an elongated body resembling the shape of a cigarette or cigar may be a formed from a single, unitary housing or the elongated housing can be formed of two or more separable bodies. For example, an aerosol delivery device may comprise an elongated shell or body that may be substantially tubular in shape and, as such, resemble the shape of a conventional cigarette or cigar. However, various other shapes and configurations may be employed in other implementations (e.g., rectangular or fob-shaped). In one example, all of the components of the aerosol delivery device are contained within one housing. Alternatively, an aerosol delivery device may comprise two or more housings that are joined and are separable. For example, an aerosol delivery device may possess at one end a control body comprising a housing containing one or more reusable components (e.g., an accumulator such as a rechargeable battery and/or rechargeable supercapacitor, and various electronics for controlling the operation of that article), and at the other end and removably coupleable thereto, an outer body or shell containing a disposable portion (e.g., a disposable flavor-containing aerosol source member). More specific formats, configurations and arrangements of components within the single housing type of unit or within a multi-piece separable housing type of unit will be evident in light of the further disclosure provided herein. Additionally, various aerosol delivery device designs and component arrangements may be appreciated upon consideration of the commercially available electronic aerosol delivery devices.

As will be discussed in more detail below, aerosol delivery devices of the present disclosure comprise some combination of a power source (i.e., an electrical power source), at least one control component (e.g., means for actuating, controlling, regulating and ceasing power for heat generation, such as by controlling electrical current flow the power source to other components of the article—e.g., processing circuitry), a heater or heat generation member (e.g., an electrical resistance heating element and/or an inductive coil or other associated components and/or one or more radiant heating elements), and an aerosol source member that includes a substrate portion capable of yielding an aerosol upon application of sufficient heat. In various implementations, the aerosol source member may include a mouth end or tip configured to allow drawing upon the aerosol delivery device for aerosol inhalation (e.g., a defined airflow path through the article such that aerosol generated can be withdrawn therefrom upon draw).

Alignment of the components within the aerosol delivery device of the present disclosure may vary across various implementations. In some implementations, the substrate portion may be positioned proximate a heating member so as to maximize aerosol delivery to the user. Other configurations, however, are not excluded. Generally, the heating member may be positioned sufficiently near the substrate portion so that heat from the heating member can volatilize the substrate portion (as well as, in some implementations, one or more flavorants, medicaments, or the like that may likewise be provided for delivery to a user) and form an aerosol for delivery to the user. When the heating member heats the substrate portion, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device of various implementations may incorporate a battery or other electrical power source to provide current flow sufficient to provide various functionalities to the aerosol delivery device, such as powering of a heating member, powering of control systems, powering of indicators, and the like. As will be discussed in more detail below, the power source may take on various implementations. Preferably, the power source is able to deliver sufficient power to rapidly activate the heating source to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

As indicated above, the aerosol delivery device may include at least one control component. A suitable control component may include a number of electronic components, and in some examples may be formed of a printed circuit board (PCB). In some examples, the electronic components include processing circuitry configured to perform data processing, application execution, or other processing, control or management services according to one or more example implementations. The processing circuitry may include a processor embodied in a variety of forms such as at least one processor core, microprocessor, coprocessor, controller, microcontroller or various other computing or processing devices including one or more integrated circuits such as, for example, an ASIC (application specific integrated circuit), an FPGA (field programmable gate array), some combination thereof, or the like. In some examples, the processing circuitry may include memory coupled to or integrated with the processor, and which may store data, computer program instructions executable by the processor, some combination thereof, or the like. Additionally or alternatively, the control component may include one or more input/output peripherals may be coupled to or integrated with the processing circuitry, such as a communication interface to enable wireless communication with one or more networks, computing devices or other appropriately-enabled devices.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device may also be appreciated upon consideration of the commercially available electronic aerosol delivery devices.

In this regard, FIG. 1 illustrates an aerosol delivery device 100 according to an example implementation of the present disclosure. The aerosol delivery device 100 may include a control body 102 and an aerosol source member 104. In various implementations, the aerosol source member 104 and the control body 102 may be permanently or detachably aligned in a functioning relationship. In this regard, FIG. 1 illustrates the aerosol delivery device 100 in a coupled configuration, whereas FIG. 2 illustrates the aerosol delivery device 100 in a decoupled configuration. Various mechanisms may connect the aerosol source member 104 to the control body 102 to result in a threaded engagement, a press-fit engagement, an interference fit, a sliding fit, a magnetic engagement, or the like.

In various implementations, the aerosol delivery device 100 according to the present disclosure may have a variety of overall shapes, including, but not limited to an overall shape that may be defined as being substantially rod-like or substantially tubular shaped or substantially cylindrically shaped. In the implementations of FIGS. 1 and 2, the device 100 has a substantially round lateral cross-section; however, other cross-sectional shapes (e.g., oval, square, triangle, etc.) also are encompassed by the present disclosure. Such language that is descriptive of the physical shape of the article may also be applied to the individual components thereof, including the control body 102 and the aerosol source member 104. In other implementations, the control body may take another hand-held shape, such as a small box shape.

In specific implementations, one or both of the control body 102 and the aerosol source member 104 may be referred to as being disposable or as being reusable. For example, the control body 102 may have a replaceable battery or a rechargeable battery, solid-state battery, thin-film solid-state battery, rechargeable supercapacitor or the like, and thus may be combined with any type of recharging technology, including connection to a wall charger, connection to a car charger (i.e., cigarette lighter receptacle), and connection to a computer, such as through a universal serial bus (USB) cable or connector (e.g., USB 2.0, 3.0, 3.1, USB Type-C), connection to a photovoltaic cell (sometimes referred to as a solar cell) or solar panel of solar cells, or wireless charger, such as a charger that uses inductive wireless charging (including for example, wireless charging according to the Qi wireless charging standard from the Wireless Power Consortium (WPC)), or a wireless radio frequency (RF) based charger, and connection to a computer, such as through a USB cable. An example of an inductive wireless charging system is described in U.S. Pat. App. Pub. No. 2017/0112196 to Sur et al., which is incorporated herein by reference in its entirety.

In the depicted implementation, the aerosol source member 104 comprises a heated end 106, which is configured to be inserted into the control body 102, and a mouth end 108, upon which a user draws to create the aerosol. At least a portion of the heated end 106 may include the substrate portion 110. In some implementations, the substrate portion 110 may comprise tobacco-containing beads, tobacco shreds, tobacco strips, a tobacco cast sheet, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid, semi-solid, or moldable (e.g., extruded) substrate. Representative types of solid and semi-solid substrate portion constructions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017-0000188 to Nordskog et al., filed Jun. 30, 2015, all of which are incorporated by reference herein in their entireties.

In addition to the implementations described above, in other implementations the substrate portion may be configured as a liquid capable of yielding an aerosol upon application of sufficient heat, having ingredients commonly referred to as "smoke juice," "e-liquid" and "e-juice". Example formulations for an aerosol-generating liquid are described in U.S. Pat. App. Pub. No. 2013/0008457 to Zheng et al., the disclosure of which is incorporated herein by reference in its entirety. In still other implementations, the substrate portion may comprise a gel and/or a suspension. Some representative types of solid and semi-solid substrate portion constructions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017-0000188 to Nordskog et al., filed Jun. 30, 2015, all of which are incorporated by reference herein in their entireties.

In various implementations, the aerosol source member 104, or a portion thereof, may be wrapped in an overwrap material 112 (see FIG. 2), which may be formed of any material useful for providing additional structure and/or support for the aerosol source member 104. In various implementations, the mouth end 108 of the aerosol source member 104 may include a filter 114, which may be made of a cellulose acetate or polypropylene material. The filter 114 may increase the structural integrity of the mouth end of the aerosol source member, and/or provide filtering capacity, if desired, and/or provide resistance to draw. The overwrap material may comprise a material that resists transfer of heat, which may include a paper or other fibrous material, such as a cellulose material. The overwrap material may also include at least one filler material imbedded or dispersed within the fibrous material. In various implementations, the filler material may have the form of water insoluble particles. Additionally, the filler material may incorporate inorganic components. In various implementations, the overwrap may be formed of multiple layers, such as an underlying, bulk layer and an overlying layer, such as a typical wrapping paper in a cigarette. Such materials may include, for example, lightweight "rag fibers" such as flax, hemp, sisal, rice straw, and/or esparto. The overwrap may also include a material typically used in a filter element of a conventional cigarette, such as cellulose acetate. Further, an excess length of the overwrap at the mouth end 108 of the aerosol source member may function to simply separate the substrate portion 110 from the mouth of a consumer or to provide space for positioning of a filter material, as described below, or to affect draw on the article or to affect flow characteristics of the vapor or aerosol leaving the device during draw. Further discussions relating to the configurations for overwrap materials that may be used with the present disclosure may be found in U.S. Pat. No. 9,078,473 to Worm et al., which is incorporated herein by reference in its entirety.

In various implementations, other components may exist between the substrate portion 110 and the mouth end 108 of the aerosol source member 104, wherein the mouth end 108 may include a filter 114. For example, in some implementations one or any combination of the following may be positioned between the substrate portion 110 and the mouth end 108 of the aerosol source member 104: an air gap; phase change materials for cooling air; flavor releasing media; ion exchange fibers capable of selective chemical adsorption; aerogel particles as filter medium; and other suitable materials.

As will be discussed in more detail below, the present disclosure is configured for use with a conductive and/or inductive heat source to heat an aerosol forming material to form an aerosol. In some implementations, a conductive heat source may used and may comprise a heating chamber that includes a resistive heating member. Resistive heating members may be configured to produce heat when an electrical current is directed therethrough. Electrically conductive materials useful as resistive heating members may be those having low mass, low density, and moderate resistivity and that are thermally stable at the temperatures experienced during use. Useful heating members heat and cool rapidly, and thus provide for the efficient use of energy. Rapid heating of the element may be beneficial to provide almost immediate volatilization of an aerosol precursor material in proximity thereto. Rapid cooling prevents substantial volatilization (and hence waste) of the aerosol precursor material during periods when aerosol formation is not desired. Such heating members may also permit relatively precise control of the temperature range experienced by the aerosol precursor material, especially when time based current control is employed. Useful electrically conductive materials are preferably chemically non-reactive with the materials being heated (e.g., aerosol precursor materials and other inhalable substance materials) so as not to adversely affect the flavor or content of the aerosol or vapor that is produced. Example, non-limiting, materials that may be used as the electrically conductive material include carbon, graphite, carbon/graphite composites, metals, ceramics such as metallic and non-metallic carbides, nitrides, oxides, silicides, inter-metallic compounds, cermets, metal alloys, and metal foils. In particular, refractory materials may be useful. Various, different materials can be mixed to achieve the desired properties of resistivity, mass, and thermal conductivity. In specific implementations, metals that can be utilized include, for example, nickel, chromium, alloys of nickel and chromium (e.g., nichrome), and steel. Materials that can be useful for providing resistive heating are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties.

In various implementations, the heating member may be provided in a variety forms, such as in the form of a foil, a foam, discs, spirals, fibers, wires, films, yarns, strips, ribbons, or cylinders. Such heating members often comprise a metal material and are configured to produce heat as a result of the electrical resistance associated with passing an electrical current therethrough. Such resistive heating members may be positioned in proximity to the substrate portion. Alternatively, the heating member may be positioned in contact with a solid or semi-solid substrate portion. Such configurations may heat the substrate portion to produce an aerosol. A variety of conductive substrates that may be usable with the present disclosure are described in U.S. Pat. App. Pub. No. 2013/0255702 to Griffith et al., the disclosure of which is incorporated herein by reference in its entirety. Some non-limiting examples of various heating member configurations include configurations in which a heating member or element is placed in proximity with an aerosol source member. For instance, in some examples, at least a portion of a heating member may surround at least a portion of an aerosol source member. In other examples, one or more heating members may be positioned adjacent an exterior of an aerosol source member when inserted in a control body. In other examples, at least a portion of a heating member may be located inside a hollow portion of an aerosol source member when the aerosol source member is inserted into the control body.

FIG. 3 illustrates a front schematic cross-sectional view of an aerosol delivery device, according to an example implementation of the present disclosure. As illustrated in the figures, the aerosol delivery device 100 of this example implementation includes a heating chamber 116 that includes a resistive heating member 132, which is in direct contact, or substantially direct contact, with the substrate portion 110 of the aerosol source member 104. In particular, the control body 102 of the depicted implementation comprises a housing 118 that includes an opening 119 defined in an engaging end thereof. The control body 102 also includes a flow sensor 120 (e.g., a puff sensor or pressure switch), a control component 123 (e.g., processing circuitry, individually or as part of a microcontroller, a printed circuit board (PCB) that includes a microprocessor and/or microcontroller, etc.), a power source 124 (e.g., a battery, which may be rechargeable, and/or a rechargeable supercapacitor), and an end cap that, in some implementations, may include an indicator 126 (e.g., a light emitting diode (LED)). In one implementation, the indicator 126 may comprise one or more light emitting diodes, quantum dot-based light emitting diodes or the like. The indicator 126 may be in communication with the control component 123 and be illuminated, for example, when a user draws on the aerosol source member 104, when coupled to the control body 102, as detected by the flow sensor 120.

As described above, the control component 123 may include a number of electronic components such as processing circuitry. Additionally or alternatively, in some examples, the control component includes a voltage regulator circuit configured to step down voltage and step up current from the power source 124 to the resistive heating member 132 to thereby power the resistive heating member. This voltage regulator circuit may enable the resistive heating element to receive a constant current from the power source. In some examples, the voltage regulator circuit is a buck regulator circuit including a buck regulator controller and one or more switching elements. One example of a suitable buck regulator circuit is the LM2743 synchronous buck regulator controller from Texas Instruments, and one example of a suitable buck regulator circuit including the LM2743 buck regulator controller and MOSFET gate drivers is provided in Texas Instruments, "LM2743 Low Voltage N-Channel MOSFET Synchronous Buck Regulator Controller, Datasheet SNVS276H, April 2004 [Revised October 2015].

Other indices of operation are also encompassed by the present disclosure. For example, visual indicators of operation may also include changes in light color or intensity to show progression of the smoking experience. Tactile indicators of operation and sound indicators of operation may similarly be encompassed by the present disclosure. Moreover, combinations of such indicators of operation also are suitable to be used in a single smoking article. According to another aspect, the device may include one or more indicators or indicia, such as, for example, a display configured to provide information corresponding to the operation of the smoking article such as, for example, the amount of power remaining in the power source, progression of the smoking experience, indication corresponding to activating a heat source, and/or the like.

Examples of possible power sources are described in U.S. Pat. No. 9,484,155 to Peckerar et al., and U.S. Pat. App. Pub. No. 2017/0112191 to Sur et al., filed Oct. 21, 2015, the disclosures of which are incorporated herein by reference in their respective entireties. With respect to the flow sensor, representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. Pat. No. 9,423,152 to Ampolini et al., which is incorporated herein by reference in its entirety.

Still further components may be utilized in the aerosol delivery device of the present disclosure. For example, U.S.

Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and PCT Pat. App. Pub. No. WO 2010/003480 by Flick discloses a fluid flow sensing system indicative of a puff in an aerosol generating system; all of the foregoing disclosures being incorporated herein by reference in their entireties.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference in its entirety. Further, U.S. Pat. App. Pub. No. U.S. Pat. App. Pub. No. 2017-0099877 to Worm et al., filed Oct. 13, 2015, discloses capsules that may be included in aerosol delivery devices and fob-shape configurations for aerosol delivery devices, and is incorporated herein by reference in its entirety. A variety of the materials disclosed by the foregoing documents may be incorporated into the present devices in various implementations, and all of the foregoing disclosures are incorporated herein by reference in their entireties.

Referring back to FIG. 3, as noted above the control body 102 of the depicted implementation includes a heating chamber 116 configured to heat the substrate portion 110 of the aerosol source member 104. Although the heating chamber of various implementations of the present disclosure may take a variety of forms, in the particular implementation depicted in FIG. 3, the heating chamber 116 comprises an outer cylinder 130 and a heating member 132, which in this implementation comprises a trace or wire heaters embedded in or attached to an interior wall of the outer cylinder 130. In various implementations, the heating member 132 may be constructed of one or more conductive materials, including, but not limited to, copper, aluminum, platinum, gold, silver, iron, steel, brass, bronze, graphite, or any combination thereof.

As illustrated, the heating chamber 116 may extend proximate an engagement end of the housing 118, and may be configured to substantially surround a portion of the heated end 106 of the aerosol source member 104 that includes the substrate portion 110. In such a manner, the heating chamber 116 of the depicted implementation may define a generally tubular configuration; however, in other implementations the heating chamber may have other configurations. In various implementations the outer cylinder 130 may comprise a nonconductive insulating material and/or construction including, but not limited to, an insulating polymer (e.g., plastic or cellulose), glass, rubber, ceramic, porcelain, a double-walled vacuum structure, or any combinations thereof.

As noted above, in the illustrated implementation the outer cylinder 130 may also serve to facilitate proper positioning of the aerosol source member 104 when the aerosol source member 104 is inserted into the housing 118. In various implementations, the outer cylinder 130 of the heating chamber 116 may engage an internal surface of the housing 118 to provide for alignment of the heating chamber 116 with respect to the housing 118. Thereby, as a result of the fixed coupling between the heating chamber 116, a longitudinal axis of the heating chamber 116 may extend substantially parallel to a longitudinal axis of the housing 118. In particular, the support cylinder 130 may extend from the opening 119 of the housing 118 to a stop feature 134. In the illustrated implementation, an inner diameter of the outer cylinder 130 may be slightly larger than or approximately equal to an outer diameter of a corresponding aerosol source member 104 (e.g., to create a sliding fit) such that the outer cylinder 130 is configured to guide the aerosol source member 104 into the proper position (e.g., lateral position) with respect to the control body 102.

During use, the consumer initiates heating of the heating chamber 116, and in particular, the heating member 132 that is adjacent the substrate portion 110 (or a specific layer thereof). Heating of the substrate portion 110 releases the inhalable substance within the aerosol source member 104 so as to yield the inhalable substance. When the consumer inhales on the mouth end 108 of the aerosol source member 104, air is drawn into the aerosol source member 104 through openings or apertures 122 in the control body 102. The combination of the drawn air and the released inhalable substance is inhaled by the consumer as the drawn materials exit the mouth end 108 of the aerosol source member 104. In some implementations, to initiate heating, the consumer may manually actuate a pushbutton or similar component that causes the heating member of the heating chamber to receive electrical energy from the battery or other energy source. The electrical energy may be supplied for a predetermined length of time or may be manually controlled. In some implementations, flow of electrical energy does not substantially proceed in between puffs on the device (although energy flow may proceed to maintain a baseline temperature greater than ambient temperature—e.g., a temperature that facilitates rapid heating to the active heating temperature). In the depicted implementation, however, heating is initiated by the puffing action of the consumer through use of one or more sensors, such as flow sensor 120. Once the puff is discontinued, heating will stop or be reduced. When the consumer has taken a sufficient number of puffs so as to have released a sufficient amount of the inhalable substance (e.g., an amount sufficient to equate to a typical smoking experience), the aerosol source member 104 may be removed from the control body 102 and discarded. In some implementations, further sensing elements, such as capacitive sensing elements and other sensors, may be used as discussed in U.S. patent application Ser. No. 15/707,461 to Phillips et al., which is incorporated herein by reference in its entirety.

In various implementations, the aerosol source member 104 may be formed of any material suitable for forming and maintaining an appropriate conformation, such as a tubular shape, and for retaining therein a substrate portion 110. In some implementations, the aerosol source member 104 may be formed of a single wall or, in other implementations, multiple walls, and may be formed of a material (natural or synthetic) that is heat resistant so as to retain its structural integrity—e.g., does not degrade—at least at a temperature that is the heating temperature provided by the electrical heating member, as further discussed herein. While in some implementations, a heat resistant polymer may be used, in other implementations, the aerosol source member 104 may be formed from paper, such as a paper that is substantially straw-shaped. As further discussed herein, the aerosol source member 104 may have one or more layers associated therewith that function to substantially prevent movement of vapor therethrough. In one example implementation, an aluminum foil layer may be laminated to one surface of the aerosol source member. Ceramic materials also may be used. In further implementations, an insulating material may be used so as not to unnecessarily move heat away from the substrate portion. The aerosol source member 104, when formed of a single layer, may have a thickness that preferably is about 0.2 mm to about 7.5 mm, about 0.5 mm to about 4.0 mm, about 0.5 mm to about 3.0 mm, or about 1.0 mm to about 3.0 mm. Further example types of components and materials that may be used to provide the functions described above or be used as alternatives to the materials and components noted above can be those of the types set forth in U.S. Pat. App. Pub. Nos. 2010/00186757 to Crooks et al.; 2010/00186757 to Crooks et al.; and 2011/0041861 to Sebastian et al.; the disclosures of the documents being incorporated herein by reference in their entireties.

As discussed above, the aerosol source member 104 includes a substrate portion 110 proximate a heated end 106 of the member 104. In various implementations, the substrate portion 110 may include any material that, when heated, releases an inhalable substance, such as a flavor-containing substance. In the implementation of FIG. 3, the substrate portion 110 comprises a solid substrate that includes an aerosol forming material that includes the inhalable substance. In various implementations, the substrate portion specifically may include a tobacco component or a tobacco-derived material (i.e., a material that is found naturally in tobacco that may be isolated directly from the tobacco or synthetically prepared). For example, the substrate portion may comprise tobacco extracts or fractions thereof combined with an inert substrate. The substrate portion may further comprise unburned tobacco or a composition containing unburned tobacco that, when heated to a temperature below its combustion temperature, releases an inhalable substance. In some implementations, the substrate portion may comprise tobacco condensates or fractions thereof (i.e., condensed components of the smoke produced by the combustion of tobacco, leaving flavors and, possibly, nicotine).

Tobacco materials useful in the present disclosure can vary and may include, for example, flue-cured tobacco, burley tobacco, Oriental tobacco or Maryland tobacco, dark tobacco, dark-fired tobacco and *Rustica* tobaccos, as well as other rare or specialty tobaccos, or blends thereof. Tobacco materials also can include so-called “blended” forms and processed forms, such as processed tobacco stems (e.g., cut-rolled or cut-puffed stems), volume expanded tobacco (e.g., puffed tobacco, such as dry ice expanded tobacco (DIET), preferably in cut filler form), reconstituted tobaccos (e.g., reconstituted tobaccos manufactured using paper-making type or cast sheet type processes). Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 7,011,096 to Li et al.; and U.S. Pat. No. 7,017,585 to Li et al.; U.S. Pat. No. 7,025,066 to Lawson et al.; U.S. Pat. App. Pub. No. 2004-0255965 to Perfetti et al.; PCT Pat. App. Pub. No. WO 02/37990 to Bereman; and Bombick et al., *Fund. Appl. Toxicol.*, 39, p. 11-17 (1997); which are incorporated herein by reference in their entireties. Further example tobacco compositions that may be useful in a smoking device, including according to the present disclosure, are disclosed in U.S. Pat. No. 7,726, 320 to Robinson et al., which is incorporated herein by reference in its entirety.

Still further, the substrate portion may comprise an inert substrate having the inhalable substance, or a precursor thereof, integrated therein or otherwise deposited thereon. For example, a liquid comprising the inhalable substance may be coated on or absorbed or adsorbed into the inert substrate such that, upon application of heat, the inhalable substance is released in a form that can be withdrawn from the disclosed article through application of positive or negative pressure. In some aspects, the substrate portion may comprise a blend of flavorful and aromatic tobaccos in cut filler form. In another aspect, the substrate portion may comprise a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entireties.

In some implementations, the substrate portion may include tobacco, a tobacco component, and/or a tobacco-derived material that has been treated, manufactured, produced, and/or processed to incorporate an aerosol precursor composition (e.g., humectants such as, for example, propylene glycol, glycerin, and/or the like) and/or at least one flavoring agent, as well as a burn retardant (e.g., diammonium phosphate and/or another salt) configured to help prevent ignition, pyrolysis, combustion, and/or scorching of the aerosol delivery component by the heat source. Various manners and methods for incorporating tobacco into smoking articles, and particularly smoking articles that are designed so as to not purposefully burn virtually all of the tobacco within those smoking articles are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App.

Pub. No. 2007/0215167 to Crooks et al.; the disclosures of which are incorporated herein by reference in their entireties.

In some implementations, other flame/burn retardant materials and additives may be included within the substrate portion and my include organo-phosophorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thiourea, and antimony oxides are may also be used. In each aspect of flame-retardant, burn-retardant, and/or scorch-retardant materials used in the substrate portion and/or other components (whether alone or in combination with each other and/or other materials), the desirable properties are preferably provided without undesirable off-gassing or melting-type behavior. Additional flavorants, flavoring agents, additives, and other possible enhancing constituents are described in U.S. patent application Ser. No. 15/707,461 to Phillips et al., which is incorporated herein by reference in its entirety.

In addition to the inhalable substance (e.g., flavors, nicotine, or pharmaceuticals generally), the substrate portion may comprise one or more aerosol-forming or vapor-forming materials, such as a polyhydric alcohol (e.g., glycerin, propylene glycol, or a mixture thereof) and/or water. Representative types of aerosol forming materials are set forth in U.S. Pat. No. 4,793,365 to Sensabaugh, Jr. et al.; and U.S. Pat. No. 5,101,839 to Jakob et al.; PCT Pat. App. Pub. No. WO 98/57556 to Biggs et al.; and Chemical and Biological Studies on New Cigarette Prototypes that Heat Instead of Burn Tobacco, R. J. Reynolds Tobacco Company Monograph (1988); which are incorporated herein by reference in their entireties. In some aspects, the substrate portion may produce a visible aerosol upon the application of sufficient heat thereto (and cooling with air, if necessary), and the aerosol delivery component may produce an aerosol that is smoke-like. In other aspects, the aerosol delivery component may produce an aerosol that is substantially non-visible but is recognized as present by other characteristics, such as flavor or texture. Thus, the nature of the produced aerosol may be variable depending upon the specific components of the aerosol delivery component. In some aspects, the aerosol delivery component may be chemically simple relative to the chemical nature of the smoke produced by burning tobacco.

Further tobacco materials, such as a tobacco aroma oil, a tobacco essence, a spray dried tobacco extract, a freeze dried tobacco extract, tobacco dust, or the like may be combined with the vapor-forming or aerosol-forming material. It is also understood that the inhalable substance itself may be in a form whereby, upon heating, the inhalable substance is released as a vapor, aerosol, or combination thereof. In other implementations, the inhalable substance may not necessarily release in a vapor or aerosol form, but the vapor-forming or aerosol-forming material that may be combined therewith can form a vapor or aerosol upon heating and function essentially as a carrier for the inhalable substance itself. Thus, the inhalable substance may be characterized as being coated on a substrate, as being absorbed in a substrate, as being adsorbed in a substrate, or as being a natural component of the substrate (i.e., the material forming the substrate, such as a tobacco or a tobacco-derived material). Likewise, an aerosol-forming or vapor-forming material may be similarly characterized. In certain implementations, the substrate portion may particularly comprise a substrate with the inhalable substance and a separate aerosol forming material included therewith. As such, in use, the substrate may be heated, and the aerosol forming material may be volatilized into a vapor form taking with it the inhalable substance. In a specific example, the substrate portion may comprise a solid substrate with a slurry of tobacco and an aerosol-forming material and/or vapor-forming material coated thereon or absorbed or adsorbed therein. The substrate component may be any material that does not combust or otherwise degrade at the temperatures described herein that the heating member achieves to facilitate release of the inhalable substance. For example, a paper material may be used, including a tobacco paper (e.g., a paper-like material comprising tobacco fibers and/or reconstituted tobacco). Thus, in various implementations, the substrate portion may be characterized as comprising the inhalable substance, alternately as comprising the inhalable substance and a separate aerosol-former or vapor-former, alternately as comprising the inhalable substance and a substrate, or alternately as comprising the substrate portion, the separate aerosol-former or vapor-former, and the substrate. Thus, the substrate may contain one or both of the inhalable substance and the aerosol-former or vapor-former.

In some aspects of the present disclosure, the substrate portion may be configured as an extruded material, as described in U.S. Pat. App. Pub. No. 2012/0042885 to Stone et al., which is incorporated herein by reference in its entirety. In still another aspects, the substrate portion may be configured as an extruded structure and/or substrate that includes, or is essentially comprised of tobacco, tobacco-related material, glycerin, water, and/or a binder material, although certain formulations exclude the binder material. In various implementations, the binder material may be any binder material commonly used for tobacco formulations including, for example, carboxymethyl cellulose (CMC), gum (e.g. guar gum), xanthan, pullulan, and/or an alginate. According to some aspects, the binder material included in the aerosol delivery component may be configured to substantially maintain a structural shape and/or integrity of the aerosol delivery component. Various representative binders, binder properties, usages of binders, and amounts of binders are set forth in U.S. Pat. No. 4,924,887 to Raker et al., which is incorporated herein by reference in its entirety.

In some implementations, the substrate portion may be further configured to substantially maintain its structure throughout the aerosol-generating process. That is, the substrate portion may be configured to substantially maintain its shape (i.e., the aerosol delivery component does not continually deform under an applied shear stress) throughout the aerosol-generating process. Although in some implementations the substrate portion component may include liquids and/or some moisture content, in some implementations the substrate portion is configured to remain substantially solid throughout the aerosol-generating process and substantially maintain its structural integrity throughout the aerosol-generating process. Example tobacco and/or tobacco related materials suitable for a substantially solid aerosol delivery component are described in U.S. Pat. App. Pub. No. 2015/0157052 to Ademe et al.; U.S. Pat. App. Pub. No. 2015/0335070 to Sears et al.; U.S. Pat. No. 6,204,287 to White; and U.S. Pat. No. 5,060,676 to Hearn et al., which are all incorporated herein in their entirety by reference respectively.

In yet another aspect, the substrate portion may include an extruded structure and/or substrate formed from marumarized and/or non-marumarized tobacco. Marumarized tobacco is known, for example, from U.S. Pat. No. 5,105,831 to Banerjee, et al., which is incorporated by reference herein in its entirety. Marumarized tobacco includes about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents.

In another aspect, the substrate portion may include a plurality of microcapsules, beads, granules, and/or the like having a tobacco-related material. For example, a representative microcapsule may generally be spherical in shape, and may have an outer cover or shell that contains a liquid center region of a tobacco-derived extract and/or the like. In some aspects, the aerosol delivery component may include a plurality of microcapsules each formed into a hollow cylindrical shape. In one aspect, the aerosol delivery component may include a binder material configured to maintain the structural shape and/or integrity of the plurality of microcapsules formed into the hollow cylindrical shape. Various other configurations and components that may be included in the substrate portion of the present disclosure are described in in U.S. Pat. No. 9,078,473 to Worm et al., which is incorporated herein by reference in its entirety. In another aspect, the substrate portion may include one or more heat conducting materials. Examples of substrate portions that include heat conducting materials are described in U.S. patent application Ser. No. 15/905,320 to Sebastian, titled: Heat Conducting Substrate For Electrically Heated Aerosol Delivery Device, filed on Feb. 26, 2018, which is incorporated herein by reference in its entirety. A variety of other configurations for the substrate portion of an aerosol source member may be found in the discussion of similar configurations found in U.S. Pat. No. 9,078,473 to Worm et al., which is incorporated herein by reference in its entirety.

In addition to the implementations described above, in some implementations the substrate portion may be configured as a liquid capable of yielding an aerosol upon application of sufficient heat, having ingredients commonly referred to as “smoke juice,” “e-liquid” and “e-juice”. Example formulations for an aerosol-generating liquid are described in U.S. Pat. App. Pub. No. 2013/0008457 to Zheng et al., the disclosure of which is incorporated herein by reference in its entirety. In some implementations, the aerosol forming material may comprise a gel and/or a suspension. Some representative types of solid and semi-solid substrate portion constructions and formulations are disclosed in U.S. Pat. No. 8,424,538 to Thomas et al.; U.S. Pat. No. 8,464,726 to Sebastian et al.; U.S. Pat. App. Pub. No. 2015/0083150 to Conner et al.; U.S. Pat. App. Pub. No. 2015/0157052 to Ademe et al.; and U.S. Pat. App. Pub. No. 2017-0000188 to Nordskog et al., filed Jun. 30, 2015, all of which are incorporated by reference herein in their entireties.

Referring back to FIG. 3, the heated end 106 of the aerosol source member 104 is sized and shaped for insertion into the control body 102. In various implementations, the outer cylinder 130 of the control body 102 may be characterized as being defined by a wall with an inner surface and an outer surface, the inner surface defining the interior volume of the outer cylinder 130. Thus, the largest outer diameter (or other dimension depending upon the specific cross-sectional shape of the implementations) of the aerosol source member 104 may be sized to be less than the inner diameter (or other dimension) at the inner surface of the wall of the open end of the outer cylinder 130 in the control body 102. In some implementations, the difference in the respective diameters may be sufficiently small so that the aerosol source member fits snugly into the outer cylinder 130, and frictional forces prevent the aerosol source member 104 from being moved without an applied force. On the other hand, the difference may be sufficient to allow the aerosol source member 104 to slide into or out of the outer cylinder 130 without requiring undue force.

In some implementations, the overall size of the aerosol delivery device 100 may take on a size that is comparative to a cigarette or cigar shape. Thus, the device may have a diameter of about 5 mm to about 25 mm, about 5 mm to about 20 mm, about 6 mm to about 15 mm, or about 6 mm to about 10 mm. In various implementations, such dimension may particularly correspond to the outer diameter of the control body 102. In some implementations, the aerosol source member 104 may have a diameter of between about 4 mm and about 6 mm. In addition, the control body 102 and the aerosol source member may likewise be characterized in relation to overall length. For example, in some implementations the control body may have a length of about 40 mm to about 140 mm, about 45 mm to about 110 mm, or about 50 mm to about 100 mm. The aerosol source member may have a length of about 20 mm to about 60 mm, about 25 mm to about 55 mm, or about 30 mm to about 50 mm.

In the depicted implementation, the control body 102 includes a control component 123 that controls the various functions of the aerosol delivery device 100, including providing power to the electrical heating member 132. For example, the control component 123 may include a control circuit (e.g., processing circuitry), which may be connected to further components, as further described herein, and which is connected by electrically conductive wires (not shown) to the power source 124. In various implementations, the control circuit may control when and how the heating chamber 116, and particularly the heating member 132, receives electrical energy to heat the substrate portion 110 for release of the inhalable substance for inhalation by a consumer. In some implementations, such control may be activated by a flow sensor and/or actuation of pressure sensitive switches or the like, which are described in greater detail hereinafter.

As noted, the control components may be configured to closely control the amount of heat provided to the substrate portion 110. While the heat needed to volatilize the aerosol-forming substance in a sufficient volume to provide a desired dosing of the inhalable substance for a single puff can vary for each particular substance used, in some implementations the heating member may heat to a temperature of at least 120° C., at least 130° C., or at least 140° C. In some implementations, in order to volatilize an appropriate amount of the aerosol-forming substance and thus provide a desired dosing of the inhalable substance, the heating temperature may be at least 150° C., at least 200° C., at least 220° C., at least 300° C., or at least 350° C. It can be particularly desirable, however, to avoid heating to temperatures substantially in excess of about 550° C. in order to avoid degradation and/or excessive, premature volatilization of the aerosol-forming substance. Heating specifically should be at a sufficiently low temperature and sufficiently short time so as to avoid significant combustion (preferably any combustion) of the substrate portion. The present disclosure may particularly provide the components of the present device in combinations and modes of use that will yield the inhalable substance in desired amounts at relatively low temperatures. As such, yielding may refer to one or both of generation of the aerosol within the device and delivery out of the device to a consumer. In specific implementations, the heating temperature may be about 130° C. to about 310° C., about 140° C. to about 300° C., about 150° C. to about 290° C., about 170° C. to about 270° C., or about 180° C. to about 260° C. In other implementations, the heating temperature may be about 210° C. to about 390° C., about 220° C. to about 380° C., about 230° C. to about 370° C., about 250° C. to about 350° C., or about 280° C. to about 320° C.

The duration of heating may be controlled by a number of factors, as discussed in greater detail hereinbelow. Heating temperature and duration may depend upon the desired volume of aerosol and ambient air that is desired to be drawn through aerosol delivery device, as further described herein. The duration, however, may be varied depending upon the heating rate of the heating member, as the device may be configured such that the heating member is energized only until a desired temperature is reached. Alternatively, duration of heating may be coupled to the duration of a puff on the article by a consumer. Generally, the temperature and time of heating will be controlled by one or more components contained in the control housing, as noted above.

In various implementations, the electrical heating member may include any device suitable to provide heat sufficient to facilitate release of the inhalable substance for inhalation by a consumer. In certain implementations, the electrical heating member may include a resistance conductive heating member. In other implementations, the electrical heating member may include an inductive heating member. Useful heating members may be those having low mass, low density, and moderate resistivity and that are thermally stable at the temperatures experienced during use. Useful heating members may heat and cool rapidly, and thus provide for the efficient use of energy. Rapid heating of the element also provides almost immediate volatilization of the aerosol-forming substance. Rapid cooling prevents substantial volatilization (and hence waste) of the aerosol-forming substance during periods when aerosol formation is not desired. Such heating members also permit relatively precise control of the temperature range experienced by the aerosol-forming substance, especially when time-based current control is employed. Useful heating members may also be chemically non-reactive with the materials comprising the substrate portion being heated so as not to adversely affect the flavor or content of the aerosol or vapor that is produced. Example, non-limiting, materials that may comprise the heating member include carbon, graphite, carbon/graphite composites, metals, metallic and non-metallic carbides, nitrides, silicides, inter-metallic compounds, cermets, metal alloys, and metal foils. In particular, refractory materials may be useful. Various, different materials can be mixed to achieve the desired properties of resistivity, mass, thermal conductivity, and surface properties. In some implementations, refractory materials may be useful. Various, different materials may be mixed to achieve the desired properties of resistivity, mass, and thermal conductivity. In specific aspects, metals that are able to be utilized include, for example, nickel, chromium, alloys of nickel and chromium (e.g., nichrome), and steel. Materials that may be useful for providing resistance or resistive heating are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties.

The amount of inhalable material released by the aerosol delivery device 100 may vary based upon the nature of the inhalable material. Preferably, the device 100 is configured with a sufficient amount of an aerosol-former to function at a sufficient temperature for a sufficient time to release a desired amount over a course of use. The amount may be provided in a single inhalation from the device 100 or may be divided so as to be provided through a number of puffs from the article over a relatively short length of time (e.g., less than 30 minutes, less than 20 minutes, less than 15 minutes, less than 10 minutes, or less than 5 minutes). Examples of nicotine levels and wet total particulate matter that may be delivered are described in U.S. Pat. No. 9,078,473 to Worm et al., which is incorporated herein by reference in its entirety.

As noted, in various implementations the control body 102 may include one or more openings or apertures 122 therein for allowing entrance of ambient air into the interior of the outer cylinder 130. In such a manner, in some implementations the stop feature 134 may also include apertures. Thus, in some implementations when a consumer draws on the mouth end of the aerosol source member 104, air can be drawn through the apertures of the control body 102 and the stop feature 134 into the outer cylinder 130, pass into the aerosol source member 104, and be drawn through the substrate portion 110 of the aerosol source member 104 for inhalation by the consumer. In some implementations, the drawn air carries the inhalable substance through the optional filter 114 and out of an opening at the mouth end 108 of the aerosol source member 104.

In some implementations, it may be useful to provide some indication of when the aerosol source member 104 has achieved the proper distance of insertion into the outer cylinder 130 such that the heating member 132 is positioned proximate the substrate portion 110. For example, the aerosol source member 104 may include one or more markings on the exterior thereof (e.g., on the outer surface of the aerosol source member 104). In other implementations, a single mark may indicate the depth of insertion required to achieve this position. Alternatively, proper insertion distance may be indicated by the aerosol source member 104 "bottoming out" against the stop feature 134, or any other such means that may enable a consumer to recognize and understand that the aerosol source member 104 has been inserted sufficiently in the outer cylinder 130 to position the heating member 132 in the proper location relative to the substrate portion 110.

In some implementations, the aerosol delivery device 100 may include a pushbutton, which may be linked to the control component for manual control of the heating member. For example, in some implementations the consumer may use the pushbutton to energize the heating member 132. Similar functionality tied to the pushbutton may be achieved by other mechanical means or non-mechanical means (e.g., magnetic or electromagnetic). Thusly, activation of the heating member 132 may be controlled by a single pushbutton. Alternatively, multiple pushbuttons may be provided to control various actions separately. One or more pushbuttons present may be substantially flush with the casing of the control body 102.

Instead of (or in addition to) any pushbuttons, the aerosol delivery device 100 of the present disclosure may include components that energize the heating member 132 in response to the consumer's drawing on the article (i.e., puff-actuated heating). For example, the device may include a switch or flow sensor 120 in the control body 102 that is sensitive either to pressure changes or air flow changes as the consumer draws on the article (i.e., a puff-actuated switch). Other suitable current actuation/deactuation mechanisms may include a temperature actuated on/off switch or a lip pressure actuated switch. An example mechanism that can provide such puff-actuation capability includes a Model 163PC01D36 silicon sensor, manufactured by the MicroSwitch division of Honeywell, Inc., Freeport, Ill. With such sensor, the heating member may be activated rapidly by a change in pressure when the consumer draws on the device. In addition, flow sensing devices, such as those using hot-wire anemometry principles, may be used to cause the energizing of the heating member 132 sufficiently rapidly after sensing a change in air flow. A further puff actuated switch that may be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing means. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. In some implementations, a pressure-sensing tube or other passage providing fluid connection between the puff actuated switch and the outer cylinder 130 may be included in the control body 102 so that pressure changes during draw are readily identified by the switch. Other example puff actuation devices that may be useful according to the present disclosure are disclosed in U.S. Pat. Nos. 4,922,901, 4,947,874, and 4,947,874, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

When the consumer draws on the mouth end of the device 100, the current actuation means may permit unrestricted or uninterrupted flow of current through the heating member 132 to generate heat rapidly. Because of the rapid heating, it can be useful to include current regulating components to (i) regulate current flow through the heating member to control heating of the resistance element and the temperature experienced thereby, and (ii) prevent overheating and degradation of the substrate portion 110. In some implementations, the current regulating circuit may be time-based. Specifically, such a circuit may include a means for permitting uninterrupted current flow through the heating member for an initial time period during draw, and a timer means for subsequently regulating current flow until draw is completed. For example, the subsequent regulation can include the rapid on-off switching of current flow (e.g., on the order of about every 1 to 50 milliseconds) to maintain the heating member within the desired temperature range. Further, regulation may comprise simply allowing uninterrupted current flow until the desired temperature is achieved then turning off the current flow completely. The heating member may be reactivated by the consumer initiating another puff on the article (or manually actuating the pushbutton, depending upon the specific switch implementation employed for activating the heater). Alternatively, the subsequent regulation can involve the modulation of current flow through the heating member to maintain the heating member within a desired temperature range. In some implementations, so as to release the desired dosing of the inhalable substance, the heating member may be energized for a duration of about 0.2 second to about 5.0 seconds, about 0.3 second to about 4.0 seconds, about 0.4 second to about 3.0 seconds, about 0.5 second to about 2.0 seconds, or about 0.6 second to about 1.5 seconds. One example time-based current regulating circuit can include a transistor, a timer, a comparator, and a capacitor. Suitable transistors, timers, comparators, and capacitors are commercially available and will be apparent to the skilled artisan. Example timers are those available from NEC Electronics as C-1555C and from General Electric Intersil, Inc. as ICM7555, as well as various other sizes and configurations of so-called "555 Timers". An example comparator is available from National Semiconductor as LM311. Further description of such time-based current regulating circuits is provided in U.S. Pat. No. 4,947,874 to Brooks et al., which is incorporated herein by reference in its entirety.

In light of the foregoing, it can be seen that a variety of mechanisms can be employed to facilitate actuation/deactuation of current to the heating member. For example, the device may include a timer for regulating current flow in the article (such as during draw by a consumer). The device may further include a timer responsive switch that enables and disables current flow to the heating member. Current flow regulation also can comprise use of a capacitor and components for charging and discharging the capacitor at a defined rate (e.g., a rate that approximates a rate at which the heating member heats and cools). Current flow specifically may be regulated such that there is uninterrupted current flow through the heating member for an initial time period during draw, but the current flow may be turned off or cycled alternately off and on after the initial time period until draw is completed. Such cycling may be controlled by a timer, as discussed above, which can generate a preset switching cycle. In specific implementations, the timer may generate a periodic digital wave form. The flow during the initial time period further may be regulated by use of a comparator that compares a first voltage at a first input to a threshold voltage at a threshold input and generates an output signal when the first voltage is equal to the threshold voltage, which enables the timer. Such implementations further can include components for generating the threshold voltage at the threshold input and components for generating the threshold voltage at the first input upon passage of the initial time period.

As noted above, the power source 124 used to provide power to the various electrical components of the device 100 may take on various implementations. Preferably, the power source is able to deliver sufficient energy to rapidly heat the heating member in the manner described above and power the device through use with multiple aerosol source members 104 while still fitting conveniently in the device 100. One example of a power source is a TKI-1550 rechargeable lithium-ion battery produced by Tadiran Batteries GmbH of Germany. In another implementation, a useful power source may be a N50-AAA CADNICA nickel-cadmium cell produced by Sanyo Electric Company, Ltd., of Japan. In other implementations, a plurality of such batteries, for example providing 1.2-volts each, may be connected in series. Other power sources, such as rechargeable lithium-manganese dioxide batteries, may also be used. Any of these batteries or combinations thereof may be used in the power source, but rechargeable batteries are preferred because of cost and disposal considerations associated with disposable batteries. In implementations where rechargeable batteries are used, the power source 124 may further include charging contacts for interaction with corresponding contacts in a conventional recharging unit (not shown) deriving power from a standard 120-volt AC wall outlet, or other sources such as an automobile electrical system or a separate portable power supply. In further implementations, the power source may also comprise a capacitor. Capacitors are capable of discharging more quickly than batteries and can be charged between puffs, allowing the battery to discharge into the capacitor at a lower rate than if it were used to power the heating member directly. For example, a supercapacitor—i.e., an electric double-layer capacitor (EDLC)—may be used separate from or in combination with a battery. When used alone, the supercapacitor may be recharged before each use of the device 100. Thus, the present disclosure also may include a charger component that can be attached to the device between uses to replenish the supercapacitor. Thin film batteries may be used in certain implementations of the present disclosure.

As noted above, in various implementations, the aerosol delivery device 100 may comprise one or more indicators 126. Although in the depicted implementation, the indicator 126 is shown at an end of the control body 102, in various implementations the indicator 126 may be located on another portion or other portions of the control body 102. In some implementations, the indicators may be lights (e.g., light emitting diodes) that may provide indication of multiple aspects of use of the device. For example, a series of lights may correspond to the number of puffs for a given aerosol source member. Specifically, the lights may successively become lit with each puff such that when all lights are lit, the consumer is informed that the aerosol source member is spent. Alternatively, all lights may be lit upon the aerosol source member being inserted into the housing, and a light may turn off with each puff, such that when all lights are off, the consumer is informed that the aerosol source member is spent. In still other implementations, only a single indicator may be present, and lighting thereof may indicate that current was flowing to the heating member and the device is actively heating. This may ensure that a consumer does not unknowingly leave the device unattended in an actively heating mode. In alternative implementations, one or more of the indicators may be a component of the aerosol source member. Although the indicators are described above in relation to visual indicators in an on/off method, other indices of operation also are encompassed. For example, visual indicators also may include changes in light color or intensity to show progression of the smoking experience. Tactile indicators and audible indicators similarly are encompassed by the present disclosure. Moreover, combinations of such indicators also may be used in a single device.

As noted herein, the present disclosure provides an aerosol source member and an aerosol delivery device for use with an aerosol source member that includes a substrate portion, wherein the substrate portion includes a continuous thermally conductive framework integrated with an aerosol forming material, wherein the continuous thermally conductive framework is configured to enhance heat transfer from the heating member to the aerosol forming material. For example, FIG. 4 illustrates a perspective view of a portion of an aerosol source member showing a substrate portion that includes a continuous thermally conductive framework, according to an example implementation of the present disclosure. In particular, FIG. 4 depicts a substrate portion 110 that includes a continuous thermally conductive framework in the form of a thermally conductive coil 111 that is wrapped around an outer surface 115 of the aerosol forming material 113. The thermally conductive coil 111 of the depicted implementation may be constructed of metal material, such as, but not limited to, copper, aluminum, platinum, gold, silver, iron, steel, brass, bronze, or any combination thereof. In other implementations, the thermally conductive coil 111 may be constructed of a coated metal, such as, for example, aluminum-coated copper or other combinations of coatings and base materials chosen from the list above. In still other implementations, the thermally conductive coil 111 may be constructed of a ceramic material, such as, but not limited to, aluminum oxide, beryllium oxide, boron nitride, silicon carbide, silicon nitride, aluminum nitride, or any combination thereof. In still other implementations, the thermally conductive coil 111 may be constructed of a carbon material, such as, but not limited to, graphite, graphene, carbon nanotubes, nanoribbons, diamond-like structured carbon materials, or combinations thereof. And in still other implementations, the thermally conductive coil 111 may be constructed of polymer composites, such as polymer materials with metal, ceramic, or carbon fibers, including, but not limited to, polyimide, epoxy, or silicone polymers, with boron nitride, zinc oxide, or alumina fibers. In further implementations, the present disclosure contemplates that the thermally conductive framework of various implementations may be constructed of any one or any combination of the above materials, or composites that include two or more of the above materials.

In various implementations, the aerosol forming material 113 may include any of the configurations and formulations of the substrate materials discussed above, and thus reference is made to those descriptions. In various implementations, the size and configuration of the thermally conductive coil 111 and/or the aerosol forming material 113 may vary. For example, in various implementations one or more of the length, outer diameter, inner diameter, pitch, and wire diameter, among other features, may be selected to address particular design requirements. In addition, the size of the aerosol forming material 113 may vary. For example, in various implementations one or more of the length, outer diameter, inner diameter (if applicable), among other features, may be selected to address particular design requirements.

In the depicted implementation, the thermally conductive coil 111 covers substantially the entire length of the aerosol forming material 113; however, in other implementations, the thermally conductive coil 111 may cover only a portion of the length of aerosol forming material 113. The aerosol forming material 113 of the depicted implementation comprises an extruded cylinder structure comprising a tobacco or tobacco-derived material as described above. In addition, the aerosol forming material 113 of the depicted implementation may also include various additives and other components as similarly described above. As noted, however, in other implementations the aerosol forming material 113 may comprise a different shape and/or a different composition.

FIG. 5 illustrates a perspective view of a portion of an aerosol source member showing a substrate portion that includes a continuous thermally conductive framework, according to another example implementation of the present disclosure. In particular, FIG. 5 depicts a substrate portion 110 that includes a continuous thermally conductive framework in the form of a thermally conductive braid 211 that is wrapped around an outer surface 215 of the aerosol forming material 213. In various implementations, the thermally conductive braid may comprise an interwoven braid or an overlapping braid. In the depicted implementation, the thermally conductive braid 211 comprises an interwoven braid. The thermally conductive braid 211 of the depicted implementation may be constructed of metal material, such as, but not limited to, copper, aluminum, platinum, gold, silver, iron, steel, brass, bronze, or any combination thereof. In other implementations, the thermally conductive braid 211 may be constructed of a coated metal, such as, for example, aluminum-coated copper or other combinations of coatings and base materials chosen from the list above. In still other implementations, the thermally conductive braid 211 may be constructed of a ceramic material, such as, but not limited to, aluminum oxide, beryllium oxide, boron nitride, silicon carbide, silicon nitride, aluminum nitride, or any combination thereof. In still other implementations, the thermally conductive braid 211 may be constructed of a carbon material, such as, but not limited to, graphite, graphene, carbon nanotubes, nanoribbons, diamond-like structured carbon materials, or combinations thereof. And in still other implementations, the thermally conductive braid 211 may be constructed of polymer composites, such as polymer materials with metal, ceramic, or carbon fibers, including, but not limited to, polyimide, epoxy, or silicone polymers, with boron nitride, zinc oxide, or alumina fibers. In further implementations, the present disclosure contemplates that the thermally conductive framework of various implementations may be constructed of any one or any combination of the above materials, or composites that include two or more of the above materials.

In various implementations, the aerosol forming material 213 may include any of the configurations and formulations of the substrate materials discussed above, and thus reference is made to those descriptions. In various implementations, the size and configuration of the thermally conductive braid 211 and/or the aerosol forming material 213 may vary. For example, in various implementations one or more of the length, outer diameter, inner diameter, pitch, and wire diameter, among other features, may be selected to address particular design requirements. In addition, the size of the aerosol forming material 213 may vary. For example, in various implementations one or more of the length, outer diameter, inner diameter, among other features, may be selected to address particular design requirements.

In the depicted implementation, the thermally conductive braid 211 covers substantially the entire length of the aerosol forming material 213; however, in other implementations, the thermally conductive braid 211 may cover only a portion of the length of aerosol forming material 213. The aerosol forming material 213 of the depicted implementation comprises an extruded cylinder structure comprising a tobacco or tobacco-derived material as described above. In addition, the aerosol forming material 213 of the depicted implementation may also include various additives and other components as similarly described above. Is noted, in other implementations, the aerosol forming material 213 may comprise a different shape and/or a different composition.

FIG. 6 illustrates a perspective view of a portion of an aerosol source member showing a substrate portion that includes a continuous thermally conductive framework, according to another example implementation of the present disclosure. In particular, FIG. 6 depicts a substrate portion

310 that includes a continuous thermally conductive framework in the form of a thermally conductive coil 311 that is disposed within an aerosol forming material 313. The thermally conductive coil 311 of the depicted implementation is constructed of metal material, such as, but not limited to, copper, aluminum, platinum, gold, silver, iron, steel, brass, bronze, or any combination thereof. In other implementations, the thermally conductive coil 311 may be constructed of a coated metal, such as, for example, aluminum-coated copper or other combinations of coatings and base materials chosen from the list above. In still other implementations, the thermally conductive coil 311 may be constructed of a ceramic material, such as, but not limited to, aluminum oxide, beryllium oxide, boron nitride, silicon carbide, silicon nitride, aluminum nitride, or any combination thereof. In still other implementations, the thermally coil 311 may be constructed of a carbon material, such as, but not limited to, graphite, graphene, carbon nanotubes, nanoribbons, diamond-like structured carbon materials, or combinations thereof. And in still other implementations, the thermally conductive coil 311 may be constructed of polymer composites, such as polymer materials with metal, ceramic, or carbon fibers, including, but not limited to, polyimide, epoxy, or silicone polymers, with boron nitride, zinc oxide, or alumina fibers. In further implementations, the present disclosure contemplates that the thermally conductive framework of various implementations may be constructed of any one or any combination of the above materials, or composites that include two or more of the above materials.

In various implementations, the aerosol forming material 313 may include any of the configurations and formulations of the substrate materials discussed above, and thus reference is made to those descriptions. In various implementations, the size and configuration of the thermally conductive coil 311 and/or the aerosol forming material 313 may vary. For example, in various implementations one or more of the length, outer diameter, inner diameter, pitch, and wire diameter, among other features, may be selected to address particular design requirements. In addition, the size of the aerosol forming material 313 may vary. For example, in various implementations one or more of the length, outer diameter, inner diameter, among other features, may be selected to address particular design requirements.

In the depicted implementation, the thermally conductive coil 311 covers substantially the entire length of the aerosol forming material 313; however, in other implementations, the thermally conductive coil 311 may cover only a portion of the length of aerosol forming material 313. The aerosol forming material 313 of the depicted implementation comprises an extruded cylinder structure comprising a tobacco or tobacco-derived material as described above. In addition, the aerosol forming material 313 of the depicted implementation may also include various additives and other components as similarly described above. As noted, however, in other implementations the aerosol forming material 313 may comprise a different shape and/or a different composition.

FIG. 7 illustrates a perspective view of a portion of an aerosol source member showing a substrate portion that includes a continuous thermally conductive framework, according to another example implementation of the present disclosure. In particular, FIG. 7 depicts a substrate portion 410 that includes a continuous thermally conductive framework in the form of a thermally conductive braid 411 that is disposed within an aerosol forming material 413. In various implementations, the thermally conductive braid may comprise an interwoven braid or an overlapping braid. In the depicted implementation, the thermally conductive braid 411 comprises an interwoven braid. The thermally conductive braid 411 of the depicted implementation is constructed of metal material, such as, but not limited to, copper, aluminum, platinum, gold, silver, iron, steel, brass, bronze, or any combination thereof. In other implementations, the thermally conductive braid 411 may be constructed of a coated metal, such as, for example, aluminum-coated copper or other combinations of coatings and base materials chosen from the list above. In still other implementations, the thermally conductive braid 411 may be constructed of a ceramic material, such as, but not limited to, aluminum oxide, beryllium oxide, boron nitride, silicon carbide, silicon nitride, aluminum nitride, or any combination thereof. In still other implementations, the thermally conductive braid 411 may be constructed of a carbon material, such as, but not limited to, graphite, graphene, carbon nanotubes, nanoribbons, diamond-like structured carbon materials, or combinations thereof. And in still other implementations, the thermally conductive braid 411 may be constructed of polymer composites, such as polymer materials with metal, ceramic, or carbon fibers, including, but not limited to, polyimide, epoxy, or silicone polymers, with boron nitride, zinc oxide, or alumina fibers. In further implementations, the present disclosure contemplates that the thermally conductive framework of various implementations may be constructed of any one or any combination of the above materials, or composites that include two or more of the above materials.

In various implementations, the aerosol forming material 413 may include any of the configurations and formulations of the substrate materials discussed above, and thus reference is made to those descriptions. In various implementations, the size and configuration of the thermally conductive braid 411 and/or the aerosol forming material 413 may vary. For example, in various implementations one or more of the length, outer diameter, inner diameter, pitch, and wire diameter, among other features, may be selected to address particular design requirements. In addition, the size of the aerosol forming material 413 may vary. For example, in various implementations one or more of the length, outer diameter, inner diameter, among other features, may be selected to address particular design requirements.

In the depicted implementation, the thermally conductive braid 411 covers substantially the entire length of the aerosol forming material 413; however, in other implementations, the thermally conductive braid 411 may cover only a portion of the length of aerosol forming material 413. The aerosol forming material 413 of the depicted implementation comprises an extruded cylinder structure comprising a tobacco or tobacco-derived material as described above. In addition, the aerosol forming material 413 of the depicted implementation may also include various additives and other components as similarly described above. As noted, however, in other implementations the aerosol forming material 413 may comprise a different shape and/or a different composition.

FIG. 8 illustrates a perspective view of a portion of an aerosol source member showing a substrate portion that includes a continuous thermally conductive framework, according to another example implementation of the present disclosure. In particular, FIG. 8 depicts a substrate portion 510 that includes a continuous thermally conductive framework in the form of a thermally conductive elongate component 517 that includes a plurality of thermally conductive bristle-like spikes 519 extending radially therefrom. In the depicted implementation, one or both of the thermally conductive elongate component 517 and the thermally conductive plurality of spikes 519 are constructed of metal material, such as, but not limited to, copper, aluminum, platinum, gold, silver, iron, steel, brass, bronze, or any combination thereof. In other implementations, one or both of the thermally conductive elongate component 517 and the thermally conductive plurality of spikes 519 may be constructed of a coated metal, such as, for example, aluminum-coated copper or other combinations of coatings and base materials chosen from the list above. In still other implementations, one or both of the thermally conductive elongate component 517 and the thermally conductive plurality of spikes 519 may be constructed of a ceramic material, such as, but not limited to, aluminum oxide, beryllium oxide, boron nitride, silicon carbide, silicon nitride, aluminum nitride, or any combination thereof. In still other implementations, one or both of the thermally conductive elongate component 517 and the thermally conductive plurality of spikes 519 may be constructed of a carbon material, such as, but not limited to, graphite, graphene, carbon nanotubes, nanoribbons, diamond-like structured carbon materials, or combinations thereof. And in still other implementations, one or both of the thermally conductive elongate component 517 and the thermally conductive plurality of spikes 519 may be constructed of polymer composites, such as polymer materials with metal, ceramic, or carbon fibers, including, but not limited to, polyimide, epoxy, or silicone polymers, with boron nitride, zinc oxide, or alumina fibers. In further implementations, the present disclosure contemplates that the thermally conductive framework of various implementations may be constructed of any one or any combination of the above materials, or composites that include two or more of the above materials. For example, in some implementations the central thermally conductive central elongate component may be constructed on one material, and the thermally conductive plurality of spikes may be constructed of another material.

In various implementations, the aerosol forming material 513 may include any of the configurations and formulations of the substrate materials discussed above, and thus reference is made to those descriptions. In various implementations, the size and configuration of the thermally conductive elongate component 517, the thermally conductive plurality of spikes 519, and/or the aerosol forming material 513 may vary. For example, in various implementations one or more of the length and diameter of the elongate thermally conductive component 517, and the number, frequency, and length of the plurality of spikes 519, among other features of these components, may be selected to address particular design requirements. In addition, the size of the aerosol forming material 513 may vary. For example, in various implementations one or more of the length, outer diameter, inner diameter, among other features, may be selected to address particular design requirements.

In the depicted implementation, both the thermally conductive elongate component 517 and the thermally conductive plurality of spikes 519 cover substantially the entire length of the aerosol forming material 513. In other implementations, however, one or both the thermally conductive elongate component 517 and the thermally conductive plurality of spikes 519 may cover only a portion of the length of aerosol forming material 513. The aerosol forming material 513 of the depicted implementation comprises a tube-like structure comprising a tobacco or tobacco-derived material as described above. In addition, the aerosol forming material 513 of the depicted implementation may also include various additives and other components as similarly described above. As noted, however, in other implementations the aerosol forming material 513 may comprise a different shape and/or a different composition.

In various implementations, including, for example, the implementation of FIG. 8, a heating member may be configured to heat from the outside of the substrate portion inwardly and/or from the inside of the substrate portion outwardly. Thus, in some implementations the heating member may include the stop feature and/or another feature configured to generate heat from an approximate center of the substrate portion outwardly. With reference to FIG. 8, for example, in addition to, or as an alternative to, a heating member that may generate heat from the outer surface of the substrate portion 510 inwardly, heat may be generated from an approximate center of the substrate portion 510 outwardly, such as, for example, by heating the thermally conductive elongate component 517.

In addition to being configured for use with a conductive heat source, the present disclosure may also be configured for use with an inductive heat source to heat a substrate portion to form an aerosol. In various implementations, an inductive heat source may comprise a resonant transformer, which may comprise a resonant transmitter and a resonant receiver (e.g., a susceptor). In some implementations, the resonant transmitter and the resonant receiver may be located in the control body. As will be discussed in more detail below, in some implementations, a resonant transmitter may comprise a helical coil configured to circumscribe a cavity into which an aerosol source member, and in particular, a substrate portion of an aerosol source member, is received. In some implementations, the helical coil may be located between an outer wall of the device and the receiving cavity. In one implementation, the coil wire may have a circular cross section shape; however, in other implementations, the coil wire may have a variety of other cross section shapes, including, but not limited to, oval shaped, rectangular shaped, L-shaped, T-shaped, and triangular shaped cross sections, as well as combinations thereof. Some examples of possible resonant transformer components, including resonant transmitters and resonant receivers, are described in U.S. patent application Ser. No. 15/799,365, filed on Oct. 31, 2017, tilted Induction Heated Aerosol Delivery Device, which is incorporated herein by reference in its entirety. Further examples of various induction-based control components and associated circuits are described in U.S. patent application Ser. No. 15/352,153, filed on Nov. 15, 2016, titled Induction-Based Aerosol Delivery Device, and U.S. Patent Application Publication No. 2017/0202266 to Sur et al., each of which is incorporated herein by reference in its entirety.

FIG. 9 illustrates a perspective view of an aerosol delivery device of another example implementation, wherein the aerosol source member and the control body are decoupled from one another, and FIG. 10 illustrates a front schematic cross-sectional view of the aerosol delivery device of FIG. 9. In particular, the implementation depicted in FIGS. 9 and 10 includes an aerosol delivery device 600 comprising a control body 602 that is configured to receive an aerosol source member 604. As noted above, the aerosol source member 604 may comprise a heated end 606, which is configured to be inserted into the control body 602, and a mouth end 608, upon which a user draws to create the aerosol. At least a portion of the heated end 606 may include a substrate portion 610, which may comprise tobacco-containing beads, tobacco shreds, tobacco strips, reconstituted tobacco material, or combinations thereof, and/or a mix of finely ground tobacco, tobacco extract, spray dried tobacco extract, or other tobacco form mixed with optional inorganic materials (such as calcium carbonate), optional flavors, and aerosol forming materials to form a substantially solid or moldable (e.g., extrudable) substrate. In various implementations, the aerosol source member 604, or a portion thereof, may be wrapped in an overwrap material 612, which may be formed of any material useful for providing additional structure and/or support for the aerosol source member 604. In various implementations, the overwrap material may comprise a material that resists transfer of heat, which may include a paper or other fibrous material, such as a cellulose material. Various configurations of possible overwrap materials are described with respect to the example implementation of FIG. 3 above.

In various implementations, the mouth end of the aerosol source member 604 may include a filter 614, which may be made of a cellulose acetate or polypropylene material. As noted above, in various implementations, the filter 614 may increase the structural integrity of the mouth end of the aerosol source member, and/or provide filtering capacity, if desired, and/or provide resistance to draw. In some embodiments, the filter may be separate from the overwrap, and the filter may be held in position near the cartridge by the overwrap. Various configurations of possible filter characteristics are described with respect to the example implementation of FIG. 3 above.

The control body 602 may comprise a housing 618 that includes an opening 619 defined therein, a flow sensor 620 (e.g., a puff sensor or pressure switch), a control component 623 (e.g., processing circuitry, a printed circuit board (PCB) that includes processing circuitry, etc.), a power source 624 (e.g., a battery, which may be rechargeable, and/or a rechargeable supercapacitor), and an end cap that includes an indicator 626 (e.g., a light emitting diode (LED)). As noted above, in one implementation, the indicator 626 may comprise one or more light emitting diodes, quantum dot-based light emitting diodes or the like. The indicator can be in communication with the control component 623 and be illuminated, for example, when a user draws on the aerosol source member 604, when coupled to the control body 602, as detected by the flow sensor 620. Examples of power sources, sensors, and various other possible electrical components are described above with respect to the example implementation of FIG. 3 above.

The control body 602 of the implementation depicted in FIGS. 9 and 10 includes a resonant transmitter, and a resonant receiver, which together form the resonant transformer. It should be noted that the resonant transformer of various implementations of the present disclosure may take a variety of forms, including implementations where one or both of the resonant transmitter and resonant receiver are located in the control body. In the particular implementation depicted in FIGS. 9 and 10, the resonant transmitter of the depicted implementation comprises a helical coil 628 that surrounds a support cylinder 630. In various implementations, the resonant transmitter and the resonant receiver may be constructed of one or more conductive materials, and in further implementations the resonant receiver may be constructed of a ferromagnetic material including, but not limited to, cobalt, iron, nickel, and combinations thereof. In the illustrated implementation, the helical coil 628 is constructed of a conductive material. In further implementations, the helical coil may include a non-conductive insulating cover/wrap material.

The resonant receiver of the illustrated implementation comprises a single receiver prong 632 that extends from a receiver base member 634. In various implementations a receiver prong, whether a single receiver prong, or part of a plurality of receiver prongs, may have a variety of different geometric configurations. For example, in some implementations the receiver prong may have a cylindrical cross-section, which, in some implementations may comprise a solid structure, and in other implementations, may comprise a hollow structure. In other implementations, the receiver prong may have a square or rectangular cross-section, which, in some implementations, may comprise a solid structure, and in other implementations, may comprise a hollow structure. In various implementations, the receiver prong may be constructed of a conductive material. In the illustrated implementation, the receiver prong 632 is constructed of a ferromagnetic material including, but not limited to, cobalt, iron, nickel, and combinations thereof. In various implementations, the receiver base member 634 may be constructed of a non-conductive and/or insulating material.

As illustrated, the resonant transmitter 628 may extend proximate an engagement end of the housing 618, may be configured to substantially surround the portion of the heated end 606 of the aerosol source member 604 that includes the inhalable substance medium 610, and may surround a support cylinder 630. The support cylinder 630, which may define a tubular configuration, may be configured to support the helical coil 628 such that the coil does not move into contact with, and thereby short-circuit with, the resonant receiver prong 632. In such a manner, in some implementations the support cylinder 630 may comprise a nonconductive material, which may be substantially transparent to an oscillating magnetic field produced by the helical coil. In various implementations, the helical coil 628 may be imbedded in, or otherwise coupled to, the support cylinder 630. In the illustrated implementation, the helical coil 628 is engaged with an outer surface of the support cylinder 630; however, in other implementations, the helical coil may be positioned at an inner surface of the support cylinder or be fully imbedded in the support cylinder.

In the illustrated implementation, the support cylinder 630 may also serve to facilitate proper positioning of the aerosol source member 604 when the aerosol source member 604 is inserted into the housing. In particular, the support cylinder 630 may extend from the opening 619 of the housing 618 to the receiver base member 634. In the illustrated implementation, an inner diameter of the transmitter source cylinder 630 may be slightly larger than or approximately equal to an outer diameter of a corresponding aerosol source member 604 (e.g., to create a sliding fit) such that the support cylinder 630 guides the aerosol source member 604 into the proper position (e.g., lateral position) with respect to the control body 602. In the illustrated implementation, the control body 602 is configured such that when the aerosol source member 604 is inserted into the control body 602, the receiver prong 632 are located in the approximate radial center of the heated end 606 of the aerosol source member 604. In such a manner, when used in conjunction with an extruded substrate portion that defines a hollow structure, the receiver prong is located inside of a cavity defined by an inner surface of the hollow structure, and thus does not contact the inner surface of the extruded hollow structure.

The implementation described with respect to FIGS. 9 and 10 may be used with any of the portions of an aerosol source member described or contemplated herein, including those described with respect to FIGS. 4-8. In particular, inductive heating assemblies of various implementations of the present disclosure may be used to heat a substrate portion that includes a continuous thermally conductive framework integrated with an aerosol forming material, as described above.

In various implementations, the support cylinder may engage an internal surface of the housing to provide for alignment of the support member with respect to the housing. Thereby, as a result of the fixed coupling between the support member and the resonant transmitter, a longitudinal axis of the resonant transmitter may extend substantially parallel to a longitudinal axis of the housing. In various implementations, the resonant transmitter may be positioned out of contact with the housing, so as to avoid transmitting current from the transmitter coupling device to the outer body. In some implementations, an insulator may be positioned between the resonant transmitter and the housing, so as to prevent contact therebetween. As may be understood, the insulator and the support member may comprise any nonconductive material such as an insulating polymer (e.g., plastic or cellulose), glass, rubber, ceramic, and porcelain. Alternatively, the resonant transmitter may contact the housing in implementations in which the housing is formed from a nonconductive material such as a plastic, glass, rubber, ceramic, or porcelain.

The present disclosure provides devices and methods of using devices that use electrical energy to heat a heat source, which in turn heats a tobacco or tobacco derived material (preferably without combusting the tobacco or tobacco derived material to any significant degree) to form an inhalable substance such as an aerosol, the articles being sufficiently compact to be considered "hand-held" devices. In certain implementations, the device may particularly be characterized as smoking articles. As used herein, the term is intended to mean a device or article that provides the taste and/or the sensation (e.g., hand-feel or mouth-feel) of smoking a cigarette, cigar, or pipe without the actual combustion of any component of the device. The term smoking device or article does not necessarily indicate that, in operation, the device produces smoke in the sense of the by-product of combustion or pyrolysis. Rather, smoking relates to the physical action of an individual in using the device—e.g., holding the device in a hand, drawing on one end of the device, and inhaling from the device. In further implementations, the inventive devices may be characterized as being vapor-producing devices, aerosolization devices, or pharmaceutical delivery devices. Thus, the devices may be arranged so as to provide one or more substances in an inhalable state.

It should be noted that although the aerosol source member and control body may be provided together as a complete smoking article or pharmaceutical delivery article generally, the components also may be provided separately. For example, the present disclosure also encompasses a disposable unit for use with a reusable smoking article or a reusable pharmaceutical delivery article. In specific implementations, such a disposable unit (which may be an aerosol source member as illustrated in the appended figures) can comprise a substantially tubular shaped body having a heated end configured to engage the reusable smoking article or pharmaceutical delivery article, an opposing mouth end configured to allow passage of an inhalable substance to a consumer, and a wall with an outer surface and an inner surface that defines an interior space. Various implementations of an aerosol source member (or cartridge) are described in U.S. Pat. No. 9,078,473 to Worm et al., which is incorporated herein by reference in its entirety.

In addition to the disposable unit, the present disclosure further may be characterized as providing a separate control body for use in a reusable smoking article or a reusable pharmaceutical delivery article. In specific implementations, the control body may generally be a housing having a receiving end (which may include a receiving chamber with an open end) for receiving a heated end of a separately provided aerosol source member. The control body may further include an electrical energy source that provides power to an electrical heating member, which may be a component of the control body or may be included in aerosol source member to be used with the control unit. For example, in some implementations, the electrical energy source may power a heating assembly that, in some implementations, may include one or more prongs that form the heating member, and the heating assembly may have associated electrical contacts that connect the heating member to the electrical energy source. In other implementations, the heating assembly may include a flexible heating member that substantially envelopes a heating cylinder. In other implementations, instead of including a unitary heating member, the heating assembly may comprise separate heating member components, with one component as part of the control body and another component as part of the aerosol source member.

In various implementations, the control body may also include further components, including an electrical power source (such as a battery), components for actuating current flow into the heating member, and components for regulating such current flow to maintain a desired temperature for a desired time and/or to cycle current flow or stop current flow when a desired temperature has been reached or the heating member has been heating for a desired length of time. In some implementations, the control unit further may comprise one or more pushbuttons associated with one or both of the components for actuating current flow into the heating member, and the components for regulating such current flow. The control body may also include one or more indicators, such as lights indicating the heater is heating and/or indicating the number of puffs remaining for an aerosol source member that is used with the control body.

Although the various figures described herein illustrate the control body and aerosol source member in a working relationship, it is understood that the control body and the aerosol source member may exist as individual devices. Accordingly, any discussion otherwise provided herein in relation to the components in combination also should be understood as applying to the control body and the aerosol source member as individual and separate components.

In another aspect, the present disclosure may be directed to kits that provide a variety of components as described herein. For example, a kit may comprise a control body with one or more aerosol source members. A kit may further comprise a control body with one or more charging components. A kit may further comprise a control body with one or more batteries. A kit may further comprise a control body with one or more aerosol source members and one or more charging components and/or one or more batteries. In further implementations, a kit may comprise a plurality of aerosol source members. A kit may further comprise a plurality of aerosol source members and one or more batteries and/or one or more charging components. In the above implementations, the aerosol source members or the control bodies may be provided with a heating member inclusive thereto. The inventive kits may further include a case (or other packaging, carrying, or storage component) that accommodates one or more of the further kit components. The case could be a reusable hard or soft container. Further, the case could be simply a box or other packaging structure.

Many modifications and other embodiments of the present disclosure will come to mind to one skilled in the art to which this disclosure pertains having the benefit of the teachings presented in the foregoing descriptions and the associated drawings. Therefore, it is to be understood that the present disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

That which is claimed:

1. An aerosol delivery device configured to yield an inhalable substance, the aerosol delivery device comprising:
- a control body having a closed distal end and an open engaging end;
- a heating member;
- a control component located within the control body and configured to control the heating member;
- a power source located within the control body and configured to provide power to the control component; and
- a removable aerosol source member that includes a substrate portion, the aerosol source member being configured to be inserted into the engaging end of the control body and defining a heated end and a mouth end, the heated end configured, when inserted into the control body, to be positioned proximate the heating member, and the mouth end configured to extend beyond the engaging end of the control body,
- wherein the substrate portion includes a continuous thermally conductive framework integrated with an aerosol forming material, wherein the continuous thermally conductive framework is configured to enhance heat transfer from the heating member to the aerosol forming material, and wherein the continuous thermally conductive framework comprises an interwoven or overlapping braid, and wherein the interwoven or overlapping braid comprises individual strands that intersect or overlap each other at a non-zero angles therefrom.

2. The aerosol delivery device of claim 1, wherein the interwoven or overlapping braid is disposed about an outer surface of the aerosol forming material.

3. The aerosol delivery device of claim 1, wherein the interwoven or overlapping braid is disposed within the aerosol forming material.

4. The aerosol delivery device of claim 1, wherein the continuous thermally conductive framework comprises at least one of a metal material, a coated metal material, a ceramic material, a carbon material, a polymer composite, and any combination thereof.

5. The aerosol delivery device of claim 1, wherein the substrate portion comprises an extruded hollow structure.

6. The aerosol delivery device of claim 1, wherein the substrate portion comprises a single centrally located longitudinal hole and/or a plurality of longitudinal holes.

7. The aerosol delivery device of claim 1, wherein the substrate portion comprises a substantially solid structure.

8. The aerosol delivery device of claim 1, wherein the substrate portion comprises a tobacco or a tobacco-derived material.

9. The aerosol delivery device of claim 1, wherein the substrate portion comprises a non-tobacco material.

10. The aerosol delivery device of claim 1, wherein the heating member comprises an inductive heat source.

11. An aerosol source member configured to removably engage an engaging end of a control body that includes a heating member, the aerosol source member comprising:

a heated end and a mouth end, the heated end configured, when inserted into the control body, to be positioned proximate the heating member, and the mouth end configured to extend beyond the engaging end of the control body; and a substrate portion that includes a continuous thermally conductive framework integrated with an aerosol forming material, wherein the continuous thermally conductive framework is configured to enhance heat transfer from the heating member to the aerosol forming material, and wherein the continuous thermally conductive framework comprises an interwoven or overlapping braid, and wherein the interwoven or overlapping braid comprises individual strands that intersect or overlap each other at a non-zero angles therefrom.

12. The aerosol source member of claim 11, wherein the interwoven or overlapping braid is disposed about an outer surface of the aerosol forming material.

13. The aerosol source member of claim 11, wherein the interwoven or overlapping braid is disposed within the aerosol forming material.

14. The aerosol source member of claim 11, wherein the continuous thermally conductive framework comprises at least one of a metal material, a coated metal material, a ceramic material, a carbon material, a polymer composite, and any combination thereof.

15. The aerosol source member of claim 11, wherein the substrate portion comprises an extruded hollow structure.

16. The aerosol source member of claim 11, wherein the substrate portion comprises a single centrally located longitudinal hole and/or a plurality of longitudinal holes.

17. The aerosol source member of claim 11, wherein the substrate portion comprises a substantially solid structure.

18. The aerosol source member of claim 11, wherein the substrate portion comprises a tobacco or a tobacco-derived material.

19. The aerosol source member of claim 11, wherein the substrate portion comprises a non-tobacco material.

20. The aerosol source member of claim 11, wherein the aerosol source member is configured to be heated via induction heating.

* * * * *